United States Patent
Aizawa et al.

(10) Patent No.: US 10,418,929 B2
(45) Date of Patent: Sep. 17, 2019

(54) SYNCHRONOUS MACHINE CONTROL DEVICE AND PERMANENT MAGNET TEMPERATURE ESTIMATION METHOD FOR SYNCHRONOUS MACHINE

(71) Applicant: MITSUBISHI ELECTRIC CORPORATION, Chiyoda-ku (JP)

(72) Inventors: Junichi Aizawa, Chiyoda-ku (JP); Yoshikazu Nakano, Chiyoda-ku (JP); Akihiro Daikoku, Chiyoda-ku (JP); Shota Hanioka, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 3 days.

(21) Appl. No.: 15/547,546

(22) PCT Filed: Jan. 18, 2016

(86) PCT No.: PCT/JP2016/051231
§ 371 (c)(1),
(2) Date: Jul. 31, 2017

(87) PCT Pub. No.: WO2016/125567
PCT Pub. Date: Aug. 11, 2016

(65) Prior Publication Data
US 2018/0269822 A1    Sep. 20, 2018

(30) Foreign Application Priority Data

Feb. 2, 2015 (JP) .................................. 2015-018277

(51) Int. Cl.
*G09F 9/40* (2006.01)
*H02P 29/66* (2016.01)
(Continued)

(52) U.S. Cl.
CPC .............. *H02P 29/662* (2016.11); *H02P 6/16* (2013.01); *H02P 21/00* (2013.01); *H02P 27/04* (2013.01)

(58) Field of Classification Search
CPC ........ H02P 21/00; H02P 27/04; H02P 29/662; H02P 6/16
See application file for complete search history.

(56) References Cited

U.S. PATENT DOCUMENTS

| 2009/0322175 A1 | 12/2009 | Kori et al. |
| 2014/0333240 A1* | 11/2014 | Kobayashi ............ H02P 21/141 318/400.02 |
| 2016/0352280 A1* | 12/2016 | Miyamoto .......... F16H 61/0025 |

FOREIGN PATENT DOCUMENTS

| CN | 103051088 A | 4/2013 |
| JP | 2005-192325 A | 7/2005 |

(Continued)

OTHER PUBLICATIONS

International Search Report dated Mar. 8, 2016 in PCT/JP2016/051231 filed Jan. 18, 2016.

*Primary Examiner* — Muhammad S Islam
(74) *Attorney, Agent, or Firm* — Oblon, McClelland, Maier & Neustadt, L.L.P.

(57) ABSTRACT

Provided are: a synchronous machine having permanent magnets as a field system; a stress estimator that estimates stress acting on the permanent magnets; and a first magnet temperature corrector that calculates an amount of demagnetization due to stress of armature interlinkage magnetic flux on the basis of the estimated stress, estimates an amount of demagnetization due to stress of the armature interlinkage magnetic flux on the basis of the rotor position of the synchronous machine, a current command and a voltage command, and the amount of demagnetization due to stress of the armature interlinkage magnetic flux; and outputs a (Continued)

permanent magnet temperature estimated value after correction, having factored therein the amount of demagnetization due to stress of the armature interlinkage magnetic flux from the estimated armature interlinkage magnetic flux.

14 Claims, 19 Drawing Sheets

(51) Int. Cl.
*H02P 6/16* (2016.01)
*H02P 21/00* (2016.01)
H02P 27/04 (2016.01)

(56) References Cited

FOREIGN PATENT DOCUMENTS

| | | |
|---|---|---|
| JP | 2010-11640 A | 1/2010 |
| JP | 2010-41842 A | 2/2010 |
| JP | 4672236 B2 | 4/2011 |
| JP | 2012-95534 A | 5/2012 |
| JP | 5291184 B2 | 9/2013 |
| WO | 2013/108877 A1 | 7/2013 |

* cited by examiner

FIG. 7

| d-AXIS CURRENT Id [A] | q-AXIS CURRENT Id [A] | DEMAGNETIZATION PROPORTION [%] FOR 10°C MAGNET TEMPERATURE RISE |
|---|---|---|
| -100 | 90 | 0.91 |
| -17 | 42 | 0.72 |
| -20 | 40 | 0.75 |
| -55 | 35 | 0.87 |
| -88 | 31 | 0.93 |

SYNCHRONOUS MACHINE CONTROL DEVICE AND PERMANENT MAGNET TEMPERATURE ESTIMATION METHOD FOR SYNCHRONOUS MACHINE

TECHNICAL FIELD

The present invention relates to a synchronous machine control device that is a control device of a synchronous machine having permanent magnets as a field system, and to a permanent magnet temperature estimation method for a synchronous machine.

BACKGROUND ART

In control of a synchronous machine having permanent magnets as a field system using a synchronous machine control device having power conversion means such as an inverter, a phenomenon referred to as "demagnetization" is known to occur whereby the strength of the magnetization of the permanent magnets of the field system, i.e. the magnetic flux, decreases with rises in temperature, for instance on account of energization of the armature windings of the synchronous machine, or due to iron loss in the synchronous machine itself. A further phenomenon known to occur is "irreversible demagnetization" in which once an allowable temperature is exceeded, the magnetic flux cannot return to the state prior to the occurrence of demagnetization, even if the temperature drops to normal temperature.

When controlling a synchronous machine having permanent magnets as a field system, it becomes therefore necessary to at least control the temperature of the permanent magnets not to be higher than an allowable temperature at which irreversible demagnetization occurs. It is deemed that demagnetization also results in drops in torque. Meanwhile, it is difficult to directly attach temperature detectors to permanent magnets, for instance due to space-related problems in the structure of the synchronous machine, or because of the surroundings thereof being protected using a case.

Many synchronous motors having permanent magnets as a field system often have the magnets inside the rotor. Therefore, such a configuration constitutes yet another serious obstacle in terms of attaching temperature detectors.

Accordingly, technologies are demanded that allow measuring or estimating indirectly, by resorting to some method, the temperature of permanent magnets, or magnetic flux correlated to the temperature of permanent magnets, to allow keeping the temperature of permanent magnets at or below an allowable temperature.

In some conventional devices (for instance, PTL 1), as examples of such synchronous machine control devices aimed at solving the above problems, the below-described steps are sequentially carried out so as to determine the demagnetization state of a rotor magnet portion.

Step ST1: measurement of rotational speed and current-voltage.

Step ST3: estimation of winding temperature on the basis of the above measured values of rotational speed and current-voltage.

Step ST4: estimation of winding resistance on the basis of the estimated value of winding temperature.

Step ST5: estimation of the temperature of the rotor magnet portion on the basis of the estimated value of winding temperature.

Step ST6: estimation of a normal value of induced voltage on the basis of the estimated value of winding temperature.

Step ST7: estimation of the actual value of induced voltage on the basis of the estimated value of the winding resistance.

Step ST8: comparing the normal value of the induced voltage coefficient with the actual value, as estimated in step ST6 and step ST7, and determining that demagnetization has occurred when the result obtained exceeds a predetermined threshold value.

Other examples of similar control devices include conventional devices (for instance, PTL 2) in which a control scheme such as the below-described one is carried out so as to estimate the temperature of permanent magnets on the basis of a sum of revolutions, iron loss and mechanical loss.

Detecting the revolutions of the rotor rotating in a non-energized state through disconnection from a load.

Estimating the magnet temperature of the rotor on the basis of the detected revolutions.

Working out a correction amount for correcting a current command for the synchronous machine (permanent magnet electric motor), on the basis of the estimated magnet temperature, and driving the synchronous machine on the basis of the correction amount.

CITATION LIST

Patent Literature

[PTL 1] Japanese Patent Application Publication No. 2005-192325
[PTL 2] International Publication No. 2013/108877
[PTL 3] Japanese Patent No. 4672236
[PTL 4] Japanese Patent No. 5291184

SUMMARY OF INVENTION

Technical Problem

However, these conventional technologies have the following problems.

In the demagnetization detection method of a permanent magnet electric motor disclosed in PTL 1 a ratio between a rise in the temperature of armature windings and a rise in the temperature of the permanent magnets of the rotor is worked out experimentally beforehand, and the temperature of the permanent magnets is estimated on the basis of the temperature of the armature windings.

However, thermal time constants are significantly dissimilar between the armature windings and the permanent magnets, while rises in temperature are affected also by other factors such as the operating conditions and the cooling performance of the electric motor. This was problematic in that it has proven difficult to work out unambiguously rises in the temperature of permanent magnets of the rotor with respect to rises in the temperature of armature windings, and also difficult to estimate magnet temperature with good precision on the basis of the temperature of the armature windings, for various conditions.

In the conventional device illustrated in PTL 2, by contrast, magnet temperature is estimated in a non-energized state through disconnection from a load. Therefore, the conventional device of PTL 2 was problematic in that it was difficult to estimate magnet temperature in an energized state (with load) where magnet temperature rises readily.

It is an object of the present invention, arrived at in order to solve the above problems, to provide a synchronous machine control device and a permanent magnet temperature estimation method for a synchronous machine that allow estimating precisely the temperature of permanent magnets under a condition of changing current (load), while driving a synchronous machine having permanent magnets as a field system, without attaching a temperature detector directly to the permanent magnets.

Solution to Problem

The synchronous machine control device according to the present invention is provided with: a synchronous machine having permanent magnets as a field system; a stress estimator that estimates stress acting on the permanent magnets; and a first magnet temperature estimator that, on the basis of the stress estimated by the stress estimator, calculates an amount of demagnetization due to stress of armature interlinkage magnetic flux, estimates the armature interlinkage magnetic flux on the basis of the rotor position of the synchronous machine, a current command and a voltage command used in driving control of the synchronous machine, and the amount of demagnetization due to stress of the armature interlinkage magnetic flux, and outputs a permanent magnet temperature estimated value after correction, having factored therein the amount of demagnetization due to stress of the armature interlinkage magnetic flux from the estimated armature interlinkage magnetic flux.

The permanent magnet temperature estimation method for a synchronous machine according to the present invention is a permanent magnet temperature estimation method for a synchronous machine having permanent magnets as a field system, the method having: a first step of estimating stress acting on the permanent magnets; a second step of calculating an amount of demagnetization due to stress of armature interlinkage magnetic flux on the basis of the stress estimated in the first step; and a third step of estimating the armature interlinkage magnetic flux on the basis of the rotor position of the synchronous machine, a current command and a voltage command used in driving control of the synchronous machine, and the amount of demagnetization due to stress of the armature interlinkage magnetic flux, and outputting a permanent magnet temperature estimated value after correction, having factored therein the amount of demagnetization due to stress of the armature interlinkage magnetic flux from the estimated armature interlinkage magnetic flux.

Advantageous Effects of Invention

The present invention has a configuration for calculating an amount of demagnetization due to stress on the basis of an estimated value of stress acting on permanent magnets, and correcting the temperature of the permanent magnets, having been estimated on the basis of the estimated value of the armature interlinkage magnetic flux, by taking into consideration an amount of demagnetization due to stress, to obtain a permanent magnet temperature estimated value after correction. As a result, it becomes possible to achieve a synchronous machine control device and a permanent magnet temperature estimation method for a synchronous machine that allow separating demagnetization due to changes in the temperature of the permanent magnets from demagnetization due to stress acting on the permanent magnets, and that allow estimating, with high precision, the temperature of permanents magnets under conditions of changing current (load), without attaching a temperature detector directly to permanent magnets, while driving a synchronous machine having permanent magnets as a field system.

BRIEF DESCRIPTION OF DRAWINGS

FIG. 7 is a diagram illustrating an example of a demagnetization rate of d-axis flux $\Phi d$ for a magnet temperature rise of 10° C. under conditions of a plurality of currents Id, Iq in d-q axes, in Embodiment 1 of the present invention.

DESCRIPTION OF EMBODIMENTS

Preferred embodiments of a synchronous machine control device and of a permanent magnet temperature estimation method for a synchronous machine of the present invention will be explained next with reference to accompanying drawings.

Embodiment 1

Figure 1:
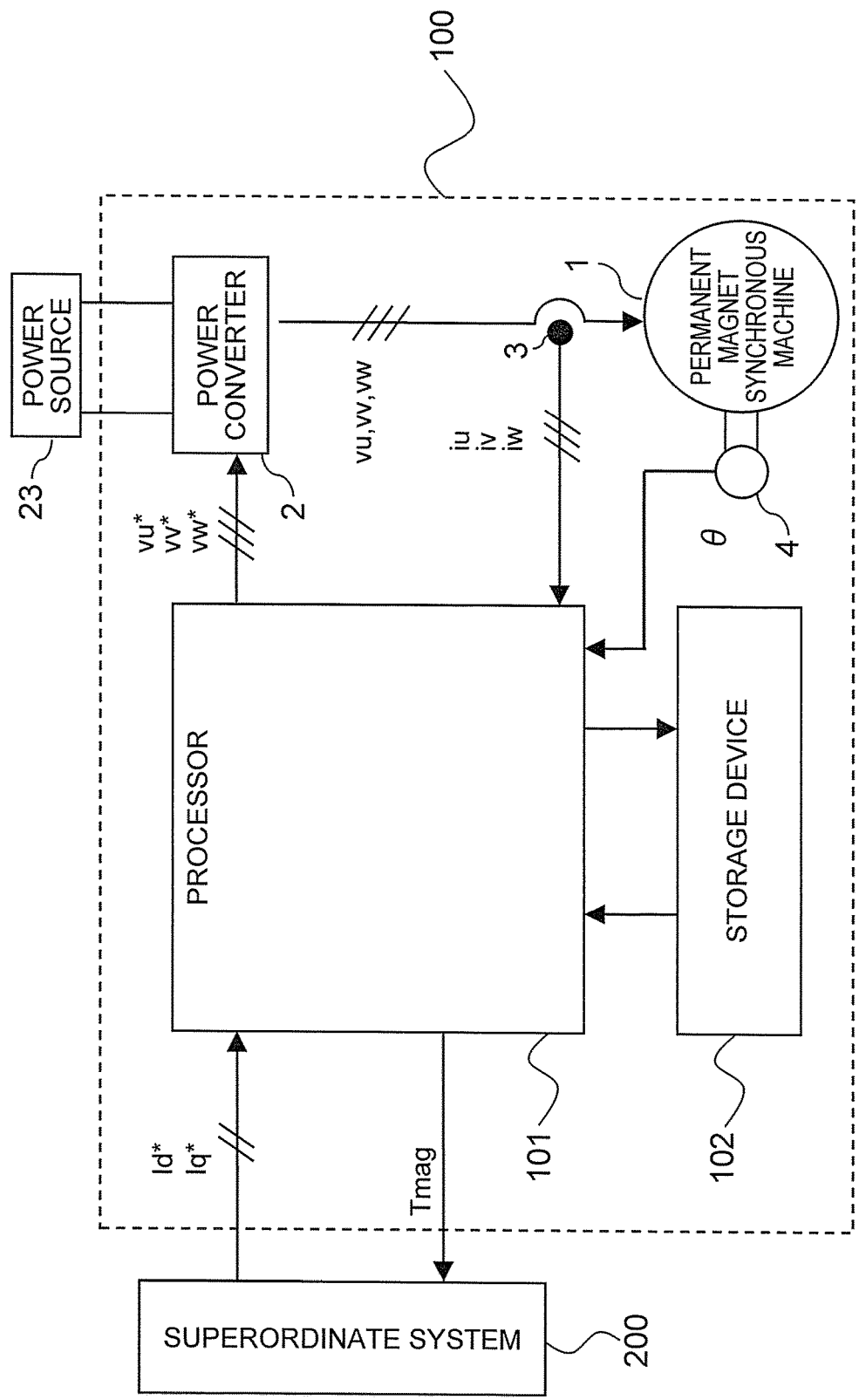
FIG. 1 is a diagram illustrating the hardware configuration of a driving system that drives a synchronous machine control device according to Embodiment 1 of the present invention.

FIG. 1 is a diagram illustrating the hardware configuration of a driving system that drives a synchronous machine control device according to Embodiment 1 of the present invention. In FIG. 1, the driving system is further provided with a superordinate system 200 and a power source 23 in addition to a synchronous machine control device 100. The synchronous machine control device 100 is provided with a permanent magnet synchronous machine 1, a power converter 2, a current detector 3, a position detector 4, a processor 101 and a storage device 102, as hardware.

Although not illustrated in the figure, the storage device 102 is provided with a volatile storage device such as a random access memory, and with a non-volatile auxiliary storage device such as a flash memory. Although not illustrated in the figure, the storage device 102 may be provided with a volatile storage device such as a random access memory, and with an auxiliary storage device such as a hard disk, instead of a non-volatile auxiliary storage device.

The processor 101 executes a program input from the storage device 102. The storage device 102 is provided with the auxiliary storage device and the volatile storage device, and accordingly a program is input from the auxiliary storage device to the processor 101, via the volatile storage device. The processor 101 may output data such as calculation results to the volatile storage device of the storage device 102, or may save such data in the auxiliary storage device via the volatile storage device.

Input and output of data and so forth between the hardware constituent elements in FIG. 1 will be described below.

Figure 2:
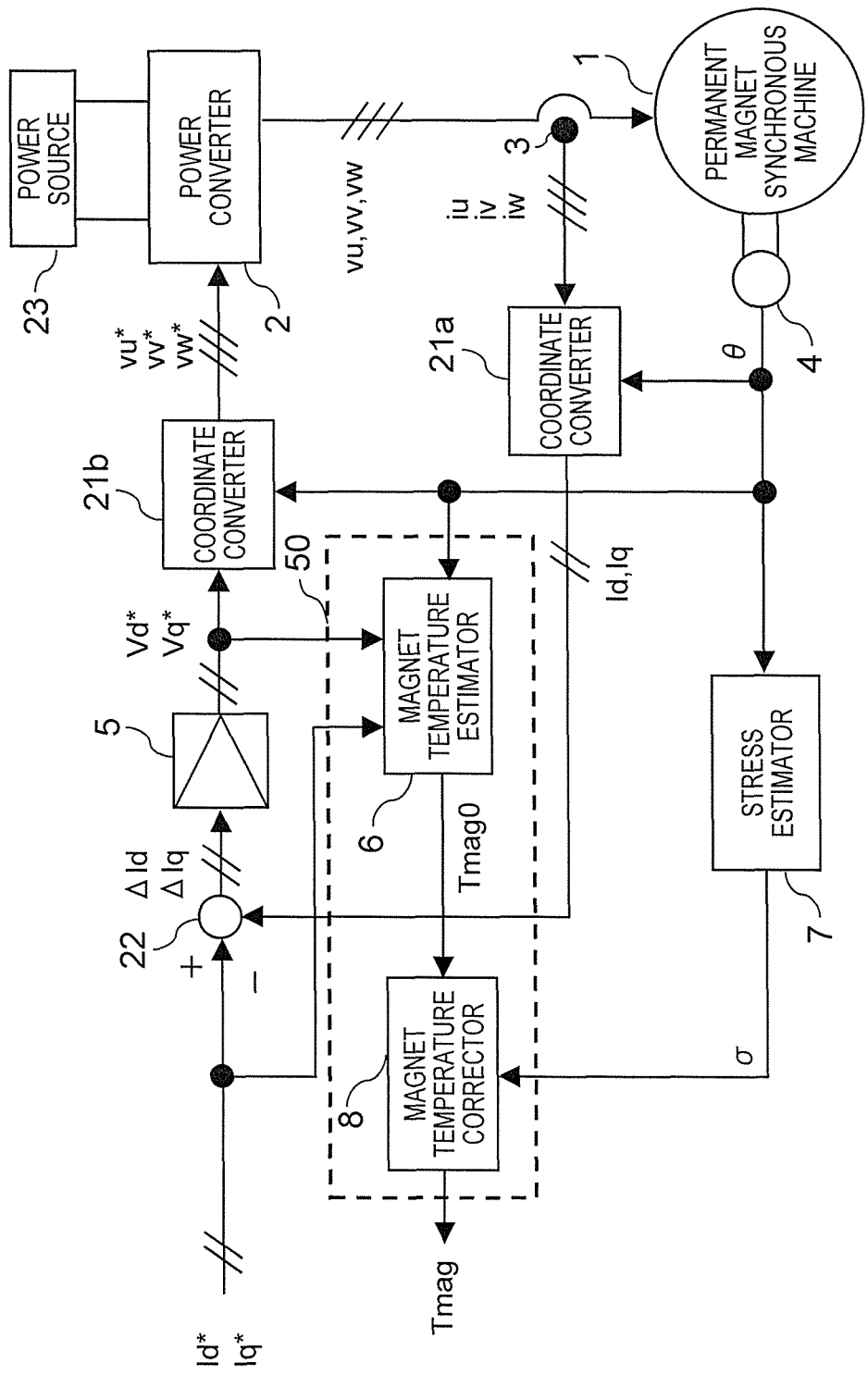
FIG. 2 is an overall configuration diagram of the synchronous machine control device according to Embodiment 1 of the present invention.

FIG. 2 is an overall configuration diagram of the synchronous machine control device according to Embodiment 1 of the present invention. The synchronous machine control device is provided with the permanent magnet synchronous machine 1, the power converter 2, the current detector 3, the position detector 4, a current controller 5, a magnet temperature estimator 6, a stress estimator 7, a magnet temperature corrector 8, coordinate converters 21a, 21b and an adder-subtractor 22. The combination of the magnet temperature estimator 6 and the magnet temperature corrector 8 constitutes a magnet temperature calculator 50. The synchronous machine control device of the present Embodiment 1 is envisaged to receive a current command in current command coordinates from a superordinate system not shown in FIG. 2, or to further receive a torque command from the superordinate system.

The current command coordinates herein denote the rotating orthogonal two-axis coordinates (d-q axes) described below. In the explanation hereafter, the term "in current command coordinates" will be abbreviated as "in d-q axes", the current commands in the respective axes corresponding herein to Id* and Iq*.

Examples of the superordinate system include for instance vehicles such as electric vehicles (EV) and hybrid automobiles provided with both an internal combustion engine and a motor; in a case where the present invention is used for driving of electric vehicles such as a railcars, moreover, the superordinate system may be a vehicle control device for establishing a current command or torque command in accordance with an input amount of an accelerator (notch) or brake by a driver (vehicle operator), and in accordance with vehicle speed and various types of current command. In other applications, such as factory automation (FA) and elevator applications, the superordinate system may generate current commands on the basis of various factors.

A temperature estimated value Tmag of permanent magnets that make up the field system of the synchronous machine 1, and which is estimated in the synchronous machine control device of the present invention, may be transmitted to the superordinate system, and be used for control of the superordinate system. In the present invention, however, the superordinate system that issues the current command is not limited, and thus the explanation of the superordinate system is confined to the matter described above.

The current controller 5, magnet temperature estimator 6, stress estimator 7, magnet temperature corrector 8, coordinate converters 21a, 21b and adder-subtractor 22 of FIG. 2 are realized by the processor 101 that executes a program stored in the storage device 102, or by a processing circuit such as a system LSI, not shown.

The above functions may be executed concertedly by a plurality of processors 101 and a plurality of storage devices 102, or may be executed concertedly by a plurality of processing circuits. Further, the above functions may be executed concertedly by combinations of a plurality of processors 101 and a plurality of storage devices 102 and of a plurality of processing circuits.

The synchronous machine 1 of the present Embodiment 1 illustrated in FIG. 2 has permanent magnets as a field system. The configuration of the synchronous machine control device according to the present Embodiment 1, for driving of the synchronous machine 1, and the functions of the constituent elements of the synchronous machine control device, will be explained next in detail.

Regarding the configuration necessary for driving the synchronous machine 1 in the present Embodiment 1, an explanation will be given first on the sequential flow from the output side of the power converter 2 up to generation of a voltage command on the input side of the power converter 2.

The power converter 2 of the present Embodiment 1 converts power supplied from the power source 23 to polyphase AC power, and outputs the polyphase AC voltage. More specifically, the power converter 2 is connected to the armature windings of the synchronous machine 1, and the conversion operation is carried out for instance by a known PWM (pulsed width modulation) inverter.

The coordinate converter 21b generates a polyphase AC voltage command through coordinate conversion of a voltage command obtained from the current controller 5 (in strict terms, a voltage command output by the current controller 5), on the basis of a rotor position θ of the synchronous machine 1 obtained from the position detector 4. On the basis of the polyphase AC voltage command generated by the coordinate converter 21b, the power converter 2 outputs the polyphase voltage to the synchronous machine 1, to drive the latter.

Output current is generated as a result in the armature windings of the synchronous machine 1. The output current generated in the armature windings will be notated hereafter as armature current.

Regarding the power source 23 in the present Embodiment 1, a power source or a battery that outputs DC voltage, and a power source in which DC voltage is obtained by way of a known converter from a single-phase or three-phase AC power source, are encompassed collectively under the denomination of power source 23.

The armature current being the output current of the synchronous machine 1 is detected by the current detector 3 that is for instance a current sensor. In a case where the synchronous machine 1 is a three-phase rotating machine, there can be adopted for the current detector 3 a configuration wherein the armature currents of all phases are detected, from among three-phase armature currents iu, iv, iw of the synchronous machine 1, or a configuration wherein two-phase armature currents are detected by working out the armature current iw of one phase (for instance the w phase) on the basis of a relationship iw=−iu−iv in the three-phase equilibrium state, using detected two-phase armature currents iu, iv.

Besides methods that involve directly measuring the armature current of respective phases, a well-known method can be also resorted to in which armature currents are detected on the basis of a DC link current that flows between the power source 23 and the power converter 2.

The position detector 4 of FIG. 2 illustrates an example where the rotor position θ of the synchronous machine 1 is detected using a known resolver, encoder or the like. The position detector 4 is however not limited to this configuration, and can also be configured to estimate the rotor position θ on the basis of a calculation using for instance voltage commands and armature currents, through the use of a known adaptive observer or the like. The term rotor position θ of the synchronous machine 1 denotes ordinarily the angle of the N pole direction of a permanent magnet with respect to an axis having a u-phase armature winding as a reference.

The rotating orthogonal two-axis coordinates that rotate at the rotational speed (equated to the electrical angle frequency ω) of the synchronous machine 1 are defined as d-q axes; in line with convention, the d-axis is established as the N pole direction of the permanent magnets, i.e. as the field system flux direction, and the q-axis is defined as the orthogonal direction with respect to d-axis, advanced by 90°. The explanation below will conform to this definition of coordinate axes.

Figure 3:
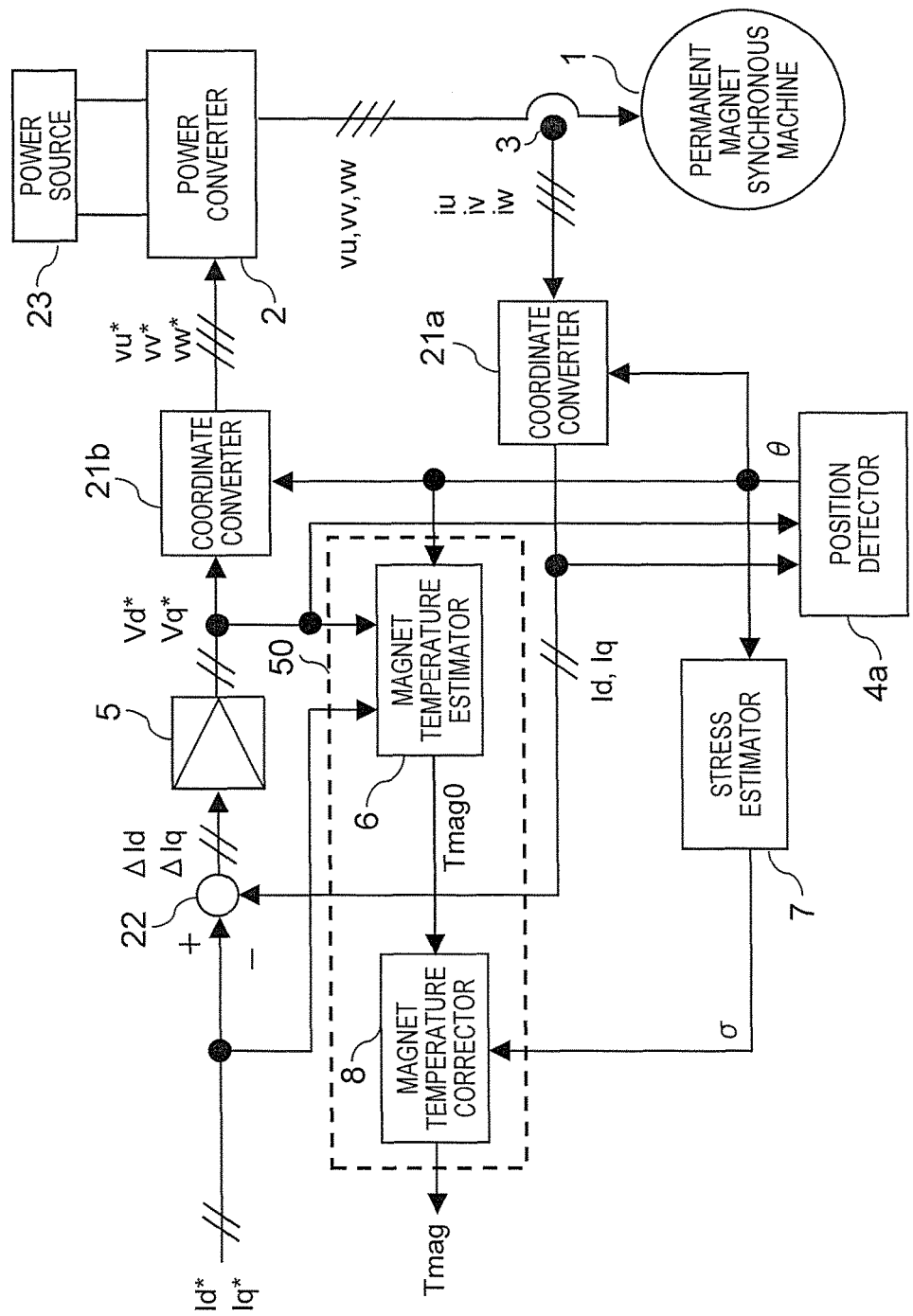
FIG. 3 is an overall configuration diagram, different from that of FIG. 2, of the synchronous machine control device according to Embodiment 1 of the present invention.

FIG. 3 is an overall configuration diagram, different from that of FIG. 2, of the synchronous machine control device according to Embodiment 1 of the present invention. Specifically, the synchronous machine control device illustrated in FIG. 3 is provided with a position detector 4a that obtains the rotor position θ through estimation calculation, instead of using the position detector 4 illustrated in FIG. 2 above. The position detector 4a can be configured as described in for instance PTL 3 and 4, and accordingly a detailed explanation of the configuration of the position detector 4a will be omitted.

Further, FIG. 2 and FIG. 3 differ only as regards the sites pertaining to the position detectors 4, 4a, other features being identical.

The embodiments described below will be explained on the basis of an example in which the rotor position θ of the synchronous machine 1 is detected using for instance the known resolver or encoder of FIG. 2. Needless to say, however, a scheme can be resorted to in these embodiments wherein the rotor position θ is estimated on the basis of for instance voltage commands, armature currents or the like, using for example the known adaptive observer of FIG. 3.

The coordinate converter 21a converts the armature currents iu, iv, iw of the synchronous machine 1 to currents Id, Iq in the d-q axes, on the basis of the rotor position θ, through calculation of Expression (1) below.

[Math. 1]

$$\begin{pmatrix} Id \\ Iq \end{pmatrix} = \begin{pmatrix} \cos\theta & \sin\theta \\ -\sin\theta & \cos\theta \end{pmatrix} \left( \sqrt{\frac{2}{3}} \begin{pmatrix} 1 & -\frac{1}{\sqrt{6}} & -\frac{1}{\sqrt{6}} \\ 0 & -\frac{1}{\sqrt{2}} & -\frac{1}{\sqrt{2}} \end{pmatrix} \right) \begin{pmatrix} iu \\ iv \\ iw \end{pmatrix} \quad (1)$$

The current controller 5 outputs the voltage commands Vd*, Vq* in the d-q axes so as to match the currents Id, Iq in the d-q axes to desired current commands Id*, Iq*. Specifically, the current controller 5 performs proportional integral control (PI control) according to Expression (2) below, on the basis of the difference between the current commands Id*, Iq* in the d-q axes and the currents Id, Iq in the d-q axes, to generate voltage commands (current feedback control commands) Vd*, Vq* in the d-q axes.

[Math. 2]

$$\begin{cases} Vd^* = \left(Kpd + \frac{Kid}{s}\right)(Id^* - Id) \\ Vq^* = \left(Kpq + \frac{Kiq}{s}\right)(Iq^* - Iq) \end{cases} \quad (2)$$

In the expression, Kpd denotes current control d-axis proportional gain, Kid denotes current control d-axis integral gain, Kpq denotes current control q-axis proportional gain, Kiq denotes current control q-axis integral gain, and s denotes the Laplace operator. The reciprocal 1/s of the Laplace operator s denotes a first time integral.

The current controller 5 may work out the voltage commands Vd*, Vq* in the d-q axes by resorting to the known voltage non-interference control that involves calculating a voltage feed-forward term using motor parameters such as inductance value and resistance value, as well as rotational speed ω, and adding the result to the respective current feedback control command.

In order to perform voltage feed-forward control, the current controller 5 needs to obtain the rotational speed ω, which is not described as an input of the current controller 5 in FIG. 2 (FIG. 3). In this case, the current controller 5 can obtain the rotational speed ω by differentiating the rotor position θ as detected by the position detector 4 (or 4a).

The voltage commands Vd*, Vq* in the d-q axes as output by the current controller 5 are converted to voltage commands vu*, vv*, vw* on the basis of the rotor position θ, through calculation according to Expression (3) below in the coordinate converter 21b, and the result is output to the power converter 2.

[Math. 3]

$$\begin{pmatrix} vu^* \\ vv^* \\ vw^* \end{pmatrix} = \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos\theta & -\sin\theta \\ \sin\theta & \cos\theta \end{pmatrix} \begin{pmatrix} Vd^* \\ Vq^* \end{pmatrix} \quad (3)$$

The power converter 2 outputs the voltages vu, vv, vw to the synchronous machine 1, according to a known PWM (pulse width modulation) scheme or the like, on the basis of the voltage commands vu*, vv*, vw*, as described above. The features above constitute the configuration necessary in order to drive the synchronous machine 1 in Embodiment 1.

An explanation follows next on the magnet temperature estimator 6, the stress estimator 7 and the magnet temperature corrector 8, which are necessary features for estimation of the temperature of the permanent magnets that form the field system of the synchronous machine 1.

Figure 4:
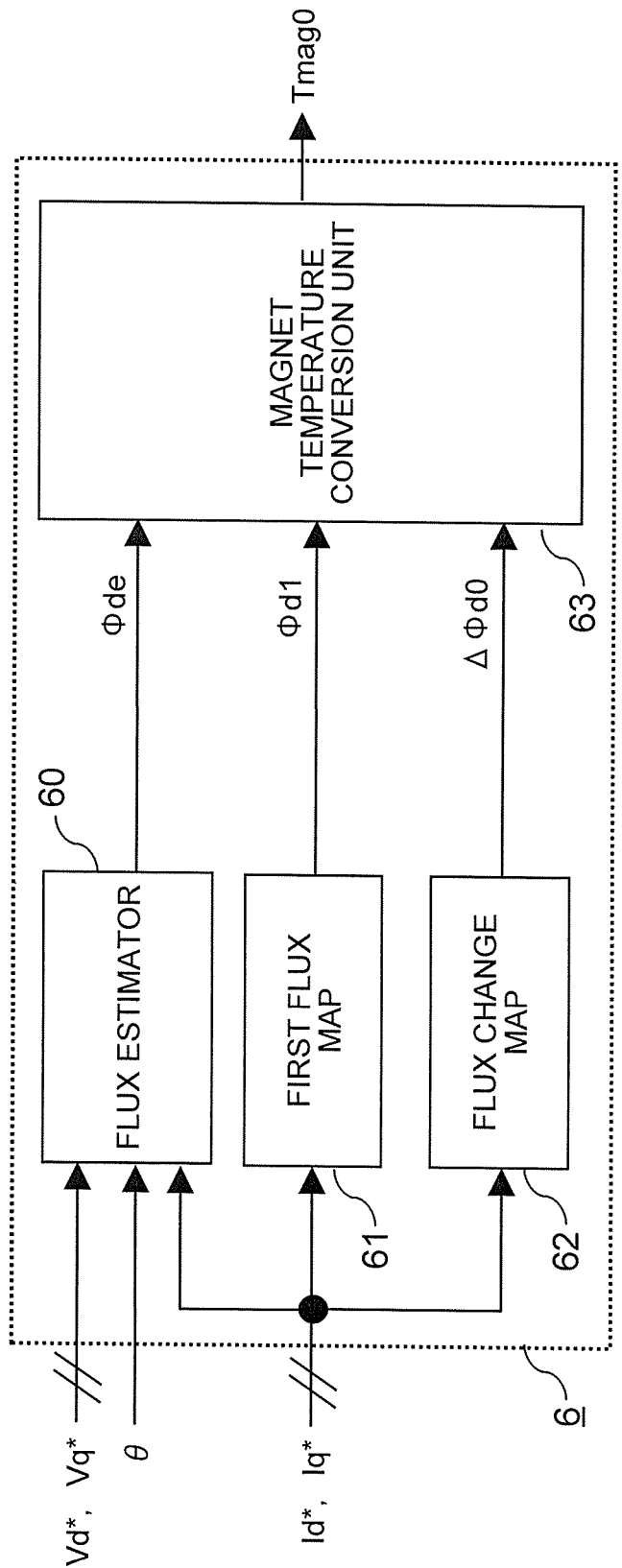
FIG. 4 is a configuration diagram illustrating an example of a magnet temperature estimator in the synchronous machine control device according to Embodiment 1 of the present invention.

FIG. 4 is a configuration diagram illustrating an example of the magnet temperature estimator 6 of the synchronous machine control device according to Embodiment 1 of the present invention. As illustrated in FIG. 4, the magnet temperature estimator 6 of the present Embodiment 1 is configured by being provided with a flux estimator 60, a first flux map 61, a flux change map 62 and a magnet temperature conversion unit 63.

During driving of the synchronous machine 1 according to the current commands Id*, Iq* in the d-q axes, the magnet temperature conversion unit 63 outputs a permanent magnet temperature estimated value Tmag0 of the synchronous machine 1 before correction, on the basis of a d-axis flux estimated value Φde estimated by the flux estimator 60, the first flux map 61 and the flux change map 62.

The reason for setting herein Tmag0 as the permanent magnet temperature estimated value of the synchronous machine 1 "before correction" is as follows. The reason is that the precision of the permanent magnet temperature estimated value of the synchronous machine 1 is enhanced by correcting Tmag0 by way of the stress estimator 7 and magnet temperature corrector 8 described below, as a one characterizing feature of the synchronous machine control device according to Embodiment 1 of the present invention, to work out the permanent magnet temperature estimated value Tmag of the synchronous machine 1 after correction.

The flux estimator 60 estimates a state quantity relating to armature interlinkage magnetic flux Φ, on the basis of the rotational speed ω, as calculated on the basis of the rotor position θ denoted by the position detector 4 (or 4a), the voltage commands Vd*, Vq* in the d-q axes and the current commands Id*, Iq* in the d-q axes (herein there may be used the currents Id, Iq in the d-q axes instead of Id*, Iq*).

The armature interlinkage magnetic flux Φ denotes the combined flux of permanent magnet flux Φm and the flux generated by armature currents (armature reaction flux) Φa.

A preferred method for estimating the state quantity pertaining to the armature interlinkage magnetic flux Φ involves working out Φd and Φq through calculation of Expression (4) below, which is a relational expression of the voltages Vd, Vq in the d-q axes, a d-axis component Φd (hereafter notated as d-axis flux) and a q-axis component Φq of the armature interlinkage magnetic flux Φ (hereafter notated as q-axis flux).

[Math. 4]

$$\begin{cases} \Phi d = \frac{1}{\omega}\{Vq - (R + Lq \cdot s)Iq\} \\ \Phi q = -\frac{1}{\omega}\{Vd - (R + Ld \cdot s)Id\} \end{cases} \quad (4)$$

A method may be resorted to, as needed, in which the absolute value |Φ| of the armature interlinkage magnetic flux Φ is worked out through calculation of Expression (5) below.

[Math. 5]

$$|\Phi| = \sqrt{(\Phi d + \Phi q)^2} \quad (5)$$

Herein, Ld denotes the inductance in the d-axis direction (hereafter notated as d-axis inductance), Lq denotes the inductance in the q-axis direction (hereafter notated as q-axis inductance), and R denotes resistance. The resistance R is mainly the resistance of the armature windings of the synchronous machine 1, if the influence of wiring resistance between the synchronous machine 1 and the power converter 2 is large enough to be non-negligible, the resistance R may be set to a resistance value having also the wiring resistance factored therein.

The Laplace operator s denotes a first time derivative, but in a steady state the derivative term need not be taken into account.

In the configuration of FIG. 2 and FIG. 3 of the present Embodiment 1, the actual values of the voltages Vd, Vq in the d-q axes are unclear. Accordingly, the flux estimator 60 works out a d-axis component Φde (hereafter, notated as d-axis flux estimated value) of an estimated value Φe of the armature interlinkage magnetic flux Φ and a q-axis component Φe (hereafter, notated as q-axis flux estimated value) of the estimated value Φe of the armature interlinkage magnetic flux Φ, through calculation of Expression (6) below, using the voltage commands Vd*, Vq* in the d-q axes instead of the voltages Vd, Vq in the d-q axes.

[Math. 6]

$$\begin{cases} \Phi de = \frac{1}{\omega}\{Vq^* - R \cdot Iq^*\} \\ \Phi qe = -\frac{1}{\omega}\{Vd^* - R \cdot Id^*\} \end{cases} \quad (6)$$

As needed, the flux estimator 60 works out an absolute value |Φe| of the estimated value Φe of the armature interlinkage magnetic flux Φ through calculation of Expression (7) below.

[Math. 7]

$$|\Phi e| = \sqrt{(\Phi de + \Phi qe)^2} \quad (7)$$

At the start of driving of the synchronous machine 1 (stopped state), the q-axis voltage command Vq* is 0, and there holds Φde=0. Accordingly, a value (set to Φm0) of predetermined permanent magnet flux is set as the initial value of Φde at the start of driving of the synchronous machine 1.

The input of the flux estimator 60 in FIG. 4 includes the rotor position θ detected by the position detector 4 (or 4a). The process by the flux estimator 60 is envisaged to include the process of obtaining the rotational speed ω through differentiation using the rotor position θ. Accordingly, the rotor position θ need not necessarily be input as an input of the flux estimator 60, if a process for obtaining the rotational speed ω is carried out in a separate constituent unit.

In the calculation of Expression (6) above, changes in current are assumed to be gentle, and thus the terms including the Laplace operator s set forth in Expression (4) may be ignored.

Figure 5:
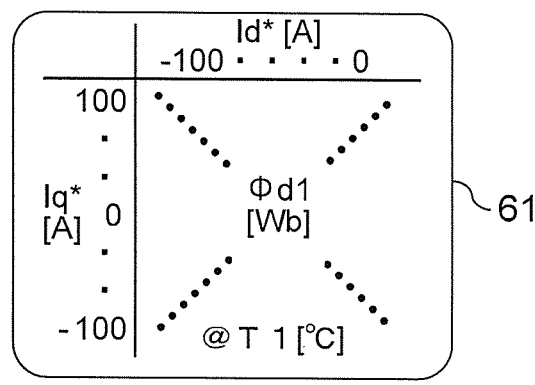
FIG. 5 is a conceptual diagram of a first flux map that constitutes a magnet temperature estimator according to Embodiment 1 of the present invention.

FIG. 5 is a conceptual diagram of the first flux map 61 that makes up the magnet temperature estimator according to Embodiment 1 of the present invention. The first flux map 61 is obtained by working out and mapping, for instance experimentally using an actual machine or using a known tool in magnetic field analysis, a correlation between the current commands Id*, Iq* in the d-q axes and the d-axis component (herein Φd1) of the armature interlinkage magnetic flux Φ in a state of temperature T1 of the permanent magnets of the synchronous machine 1, for the entire ranges of the current commands Id*, Iq* in the d-q axes as necessary in order to drive the synchronous machine 1 over the entire operation range of the latter.

In FIG. 5 the range of the d-axis current command Id* is assumed as −100 [A] to 0 [A], and the range of the q-axis current command Iq* is assumed as −100 [A] to +100 [A]. The same applies to figures hereafter.

The associations in correlation mapping may be established for the currents Id, Iq in the d-q axes, instead of the current commands Id*, Iq*. The same is true of mappings hereafter.

Through the use of the first flux map 61, the current commands Id*, Iq* in the d-q axes are converted to the d-axis component Φd1 of the armature interlinkage magnetic flux Φ, under a condition where the permanent magnets of the synchronous machine 1 are at the temperature T1.

In a case where the mapped current command condition and the current command given during driving of the synchronous machine 1 do not match each other, an estimated value of the converted value can be output by resorting to linear interpolation or an approximation method, on the basis of the first flux map 61. The estimated value can be output by resorting to a similar method, also for other maps.

Figure 6:
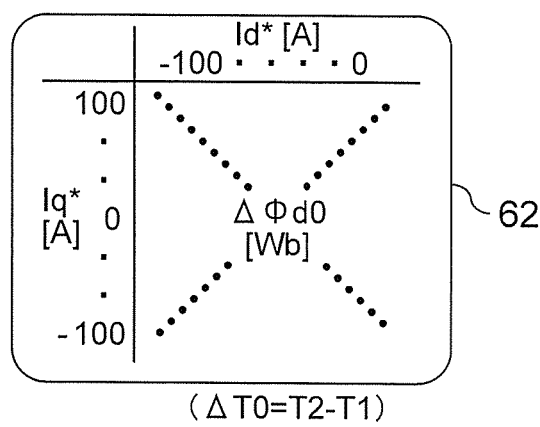
FIG. 6 is a conceptual diagram of a flux change map 62 that constitutes a magnet temperature estimator according to Embodiment 1 of the present invention.

FIG. 6 is a conceptual diagram of the flux change map 62 that makes up the magnet temperature estimator according to Embodiment 1 of the present invention. The flux change map 62 is obtained by working out and mapping, for instance experimentally using an actual machine or using a known tool in magnetic field analysis, a correlation between the current commands Id*, Iq* in the d-q axes and a change amount (herein, ΔΦd0) of the d-axis component of the armature interlinkage magnetic flux Φ, of a time where the permanent magnets of the synchronous machine 1 have changed by ΔT0 from the temperature T1 up to a temperature T2 different from the temperature T1, on the premise that the current commands Id*, Iq* in the d-q axes are constant, for the entire ranges of the current commands Id*, Iq* in the d-q axes as necessary in order to drive the synchronous machine 1 over the entire operation range of the latter.

Through the use of the flux change map 62, the current commands Id*, Iq* in the d-q axes are converted to a change amount ΔΦd0 of the d-axis component of the armature interlinkage magnetic flux Φ of a time where the permanent magnets of the synchronous machine 1 have changed by ΔT0 from the temperature T1 up to the temperature T2 that is different from the temperature T1.

Preferably, the temperatures T1, T2 are set to an upper limit and a lower limit of the range of temperature change of the permanent magnets (that form the field system of the synchronous machine 1) over which the temperature can change as a result of driving of the synchronous machine 1. In the present invention there is no preferred magnitude relation between the temperatures T1, T2.

The magnet temperature conversion unit 63 generates the permanent magnet temperature estimated value Tmag0 of the synchronous machine 1 before correction on the basis of Expression (8) below, from the d-axis flux estimated value Φde at the time of the temperature T1, as estimated by the flux estimator 60, the d-axis component Φd1 of the armature interlinkage magnetic flux Φ obtained from the first flux map 61, and the change amount ΔΦd0 of the d-axis component of the armature interlinkage magnetic flux Φ obtained from the flux change map 62, during driving of the synchronous machine 1 according to the current commands Id*, Iq* in the d-q axes.

[Math. 8]

$$Tmag0 = T1 + \frac{\Phi de - \Phi d1}{\Delta \Phi d0}(T2 - T1) \quad (8)$$

By adopting the configuration illustrated in FIG. 4 the magnet temperature estimator 6 can work out the permanent magnet temperature estimated value Tmag0 of the synchronous machine 1 before correction, during driving of the synchronous machine 1 according to the current commands Id*, Iq* in the d-q axes.

In the configuration of FIG. 4 a scheme is illustrated in which the permanent magnet temperature estimated value Tmag0 of the synchronous machine 1 before correction is worked out using the d-axis flux estimated value Φde. However, the magnet temperature estimator 6 can work out the permanent magnet temperature estimated value Tmag0 of the synchronous machine 1 before correction using the absolute value |Φe| of the estimated value Φe of the armature interlinkage magnetic flux Φ, instead of the d-axis flux estimated value Φde.

In this case, although not particularly depicted in the figures, the first flux map 61a is obtained by working out and mapping, for instance experimentally using an actual machine or using a known tool in magnetic field analysis, a correlation between the current commands Id*, Iq* in the d-q axes and an absolute value (herein |Φ1|) of the armature interlinkage magnetic flux Φ, in a state of temperature T1 of the permanent magnets of the synchronous machine 1, for the entire ranges of the current commands Id*, Iq* in the d-q axes as necessary in order to drive the synchronous machine 1 over the entire operation range of the latter.

Through the use of the first flux map 61a, the current commands Id*, Iq* in the d-q axes are converted to the absolute value |Φ1| of the armature interlinkage magnetic flux Φ under a condition where the permanent magnets of the synchronous machine 1 are at the temperature T1.

Although not particularly depicted in the figures, a flux change map 62a is obtained by working out and mapping, for instance experimentally using an actual machine or using a known tool in magnetic field analysis, a correlation between the current commands Id*, Iq* in the d-q axes and a change amount (herein, |ΔΦ0|) of the absolute value of the armature interlinkage magnetic flux Φ, of a time where the permanent magnets of the synchronous machine 1 have changed by ΔT0 from the temperature T1 up to a temperature T2, on the premise that the current commands Id*, Iq* in the d-q axes are constant, for the entire ranges of the current commands Id*, Iq* in the d-q axes as necessary in order to drive the synchronous machine 1 over the entire operation range of the latter.

Through the use of the flux change map 62a, the current commands Id*, Iq* in the d-q axes are converted to a change amount |ΔΦ0| of the absolute value of the armature interlinkage magnetic flux Φ of a time where the permanent magnets of the synchronous machine 1 have changed by ΔT0 from the temperature T1 up to the temperature T2.

By using these converted values, the magnet temperature estimator 6 can similarly work out the permanent magnet temperature estimated value Tmag0 of the synchronous machine 1 before correction on the basis of the absolute value |Φe| of the armature interlinkage magnetic flux estimated value Φe estimated by the flux estimator 60, the absolute value |Φ1| of the armature interlinkage magnetic flux Φ obtained from the first flux map 61a, and the change amount |ΔΦ0| of the absolute value of the armature interlinkage magnetic flux Φ obtained from the flux change map 62a, during driving of the synchronous machine 1 according to the current commands Id*, Iq* in the d-q axes.

An explanation follows next on the principles underlying the estimation of the permanent magnet temperature of the synchronous machine 1 in accordance with the method described above. A relational expression of the currents Id, Iq in the d-q axes, the d-axis flux Φd and the q-axis flux Φq is given by Expression (9) below when expressed using the d-axis inductance Ld, the q-axis inductance Lq and the permanent magnet flux Φm.

[Math. 9]

$$\begin{cases} \Phi d = Ld \cdot Id + \Phi m \\ \Phi q = Lq \cdot Iq \end{cases} \quad (9)$$

Assuming the d-axis current Id and the d-axis inductance Ld to be both constant, the permanent magnet flux Φm varies then with changes in the temperature of the permanent magnets, and this change appears in the d-axis flux Φd. Hence, the temperature Tm of the permanent magnets can be estimated if there is known a correlation between the d-axis flux Φd and the temperature Tin of the permanent magnets under a condition of predetermined currents Id, Iq in the d-q axes.

The correlation between the permanent magnet flux Φm, i.e. the d-axis flux Φd and the temperature Tm of the permanent magnets varies depending on the magnetic saturation state of the synchronous machine 1, which in turn varies with changes in the magnitude of armature currents.

In a conceivable instance, for example, the synchronous machine 1 has built thereinto, as a field system, permanent magnets having a characteristic of undergoing demagnetization at a proportion of 1% for a 10° C. rise in the temperature of the magnets, in a stand-alone state where the permanent magnets are not built into a motor. In this case, demagnetization of the d-axis flux Φd occurs, in a state of relaxed magnetic saturation (for instance, small absolute value of the q-axis current Iq, light load condition and the like), in a proportion of about 1% with respect to a 10° C. rise in temperature, similarly to the stand-alone state.

In a state of magnetic saturation with large absolute value of the q-axis current, however, demagnetization occurs in a proportion of 0.6% to 1.0% with respect to a 10° C. temperature rise. The change in the d-axis flux Φd with respect to the magnet temperature change is thus not uniform in relation to current conditions. The change amount depends moreover not only on the q-axis current Iq but also on the d-axis current Id.

FIG. 7 is a diagram illustrating an example of the demagnetization rate of the d-axis flux Φd for a magnet temperature rise of 10° C. under conditions of a plurality of currents Id, Iq in the d-q axes, in Embodiment 1 of the present invention.

Actually, also the magnetic saturation state varies slightly with changes in the permanent magnet flux win, on account of changes in the temperature of the permanent magnets. As a result, changes in the temperature of the permanent magnets are accompanied by changes in the values of the d-axis inductance Ld and the q-axis inductance Lq, also under a condition whereby the currents Id, Iq in the d-q axes are constant.

Accordingly, both the d-axis inductance Ld and the permanent magnet flux Φm undergo changes in the temperature Tm of the permanent magnets; moreover, the magnitude of the change in the d-axis inductance Ld and the permanent magnet flux Φm with respect to the magnet temperature change varies depending on the d-q-axis currents Id, Iq (i.e. on the load condition).

When working out the d-axis flux estimated value Φde on the basis of Expression (6) above it is thus difficult to separate the permanent magnet flux Φm from the armature reaction flux (Ld·Id) derived from the d-axis inductance Ld and the d-axis current Id. Accordingly, it is not easy to work out a direct correlation between the permanent magnet temperature Tm and the permanent magnet flux Φm.

In order to estimate precisely the temperature of the permanent magnets, the correlation between the temperature Tm of the permanent magnets and the d-axis flux Φd must be grasped for each of various conditions of currents Id, Iq in the d-q axes.

Therefore, the magnet temperature estimator 6 of the present Embodiment 1 is configured out of the flux estimator 60, the first flux map 61, the flux change map 62 and the magnet temperature conversion unit 63, as described above. The magnet temperature estimator 6 has been thus configured to output the permanent magnet temperature estimated value Tmag0 of the synchronous machine 1 before correction, on the basis of the d-axis flux estimated value Φde estimated by the flux estimator 60, the first flux map 61 and the flux change map 62, during driving of the synchronous machine 1 according to the current commands Id*, Iq* in the d-q axes.

When the permanent magnet temperature is estimated in the present Embodiment 1 on the basis of the d-axis flux estimated value Φde, having the same direction as that of the field system flux, the change in flux with respect to the magnet temperature change appears on the d-axis, as can be seen in Expression (9) above. Accordingly, this allows increasing the sensitivity of flux changes with respect to changes in magnet temperature, and the precision in the estimation of the temperature of the permanent magnets becomes higher.

The change derived from changes in the temperature of the permanent magnets appears also in the absolute value |Φ| of the armature interlinkage magnetic flux, as can be grasped from the relationships in Expression (5) and Expression (9) above. Needless to say, therefore, the temperature of the permanent magnets can be estimated using the absolute value |Φ| instead of the d-axis component of the armature interlinkage magnetic flux, as described above.

A magnet temperature estimator 6a illustrated below may be used instead of the magnet temperature estimator 6 illustrated in FIG. 4.

Figure 8:
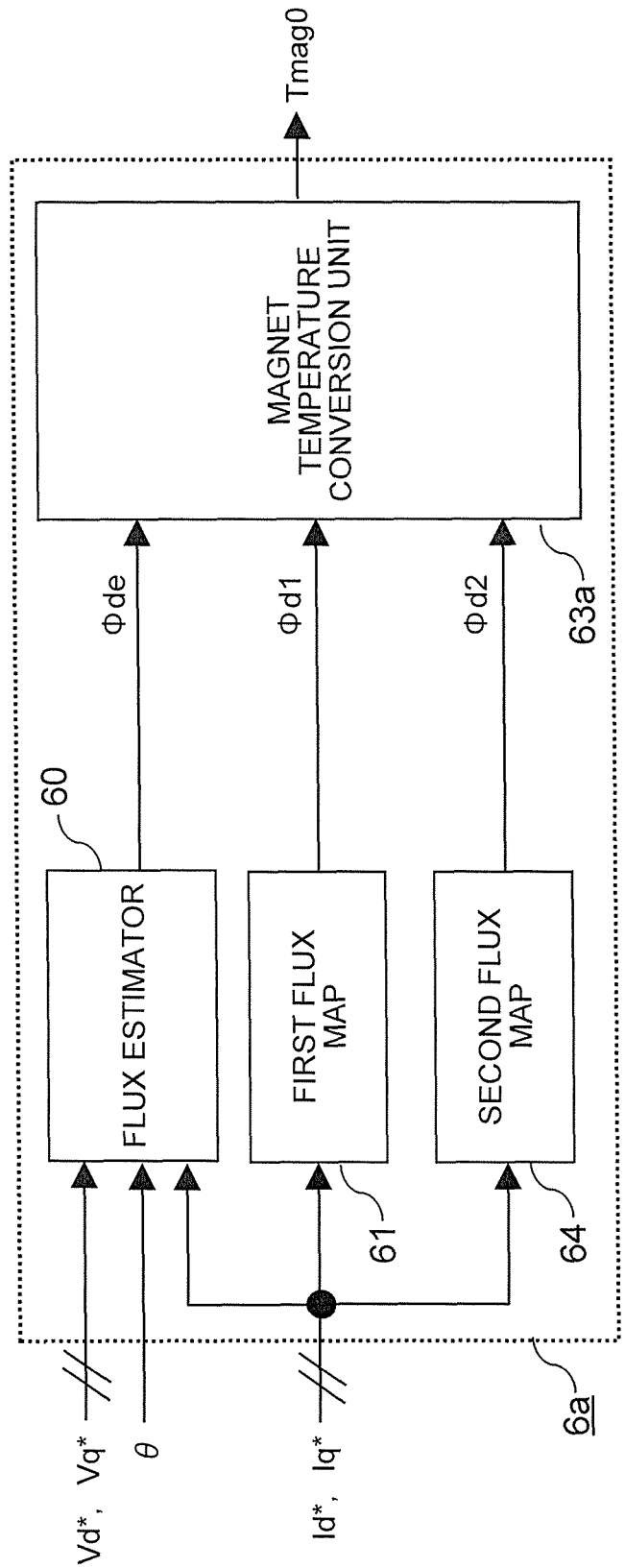
FIG. 8 is a configuration diagram illustrating an example of a magnet temperature estimator in the synchronous machine control device according to Embodiment 1 of the present invention.

FIG. 8 is a configuration diagram illustrating an example of a magnet temperature estimator 6a in the synchronous machine control device according to Embodiment 1 of the present invention. As illustrated in FIG. 8, the magnet temperature estimator 6a of the present Embodiment 1 is configured by being provided with the flux estimator 60, the first flux map 61, a second flux map 64, and a magnet temperature conversion unit 63a.

The magnet temperature conversion unit 63a outputs the permanent magnet temperature estimated value Tmag0 of the synchronous machine 1 before correction, on the basis of the d-axis flux estimated value Φde estimated by the flux estimator 60, the first flux map 61 and the second flux map 64, during driving of the synchronous machine 1 according to the current commands Id*, Iq* in the d-q axes. The features of the first flux map 61 are identical to those of the first flux map 61 illustrated in FIG. 5.

In the magnet temperature estimator 6 having the configuration illustrated in FIG. 4 a correlation between the temperature Tm of the permanent magnets and the d-axis flux Φd under various conditions of currents Id, Iq in the d-q axes, as necessary in order to precisely estimate the temperature of the permanent magnets, was worked out on the basis of two correlation information items: "a correlation between the current commands Id*, Iq* in the d-q axes and the d-axis component Φd1 of the armature interlinkage magnetic flux Φ in a state where the permanent magnets of the synchronous machine 1 is at the temperature T1", and "a correlation between the current commands Id*, Iq* in the d-q axes and the change amount ΔΦd0 in the d-axis component of the armature interlinkage magnetic flux Φ, of a time where the permanent magnets of the synchronous machine 1 have changed by ΔT0 from the temperature T1 up to the temperature T2".

By contrast, the magnet temperature estimator 6a having the configuration illustrated in FIG. 8 differs from the magnet temperature estimator 6 having the configuration of FIG. 4 in that now the correlation between the temperature Tm of the permanent magnets and the d-axis flux Φd under various conditions of currents Id, Iq in the d-q axes is worked out on the basis of the following two correlation information items: "a correlation between the current commands Id*, Iq* in the d-q axes and the d-axis component Φd1 of the armature interlinkage magnetic flux Φ in a state where the permanent magnets of the synchronous machine 1 is at the temperature T1" and "a correlation between the current commands Id*, Iq* in the d-q axes and the d-axis component of the armature interlinkage magnetic flux Φ (herein Φd2) in a state where the permanent magnets of the synchronous machine 1 is at the temperature T2".

Figure 9:
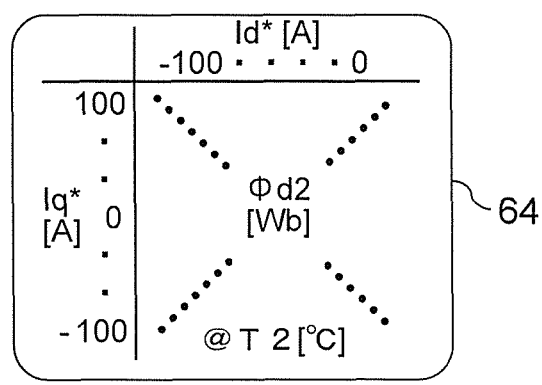
FIG. 9 is a conceptual diagram of a second flux map that constitutes a magnet temperature estimator according to Embodiment 1 of the present invention.

FIG. 9 is a conceptual diagram of the second flux map 64 that makes up the magnet temperature estimator 6a according to Embodiment 1 of the present invention. The second flux map 64 is obtained by working out and mapping, for instance experimentally using an actual machine or using a known tool in magnetic field analysis, a correlation between the current commands Id*, Iq* in the d-q axes and a d-axis component Φd2 of the armature interlinkage magnetic flux Φ in a state of temperature T2 of the permanent magnets of the synchronous machine 1, for the entire ranges of the current commands Id*, Iq* in the d-q axes as necessary in order to drive the synchronous machine 1 over the entire operation range of the latter.

Through the use of the second flux map 64, the current commands Id*, Iq* in the d-q axes are converted to the d-axis component Φd2 of the armature interlinkage magnetic flux Φ under a condition where the permanent magnets of the synchronous machine 1 are at the temperature T2.

The magnet temperature conversion unit 63a generates the permanent magnet temperature estimated value Tmag0 of the synchronous machine 1 before correction, on the basis of Expression (10), from the d-axis flux estimated value Φde estimated by the flux estimator 60, the d-axis component Φd1 of the armature interlinkage magnetic flux Φ obtained from the first flux map 61, and the d-axis component Φd2 of the armature interlinkage magnetic flux Φ obtained from the second flux map 64, during driving of the synchronous machine 1 according to the current commands Id*, Iq* in the d-q axes.

[Math. 10]

$$Tmag0 = \frac{T2 - T1}{\Phi d2 - \Phi d1}\Phi de + \frac{\Phi d2 \cdot T1 - \Phi d1 \cdot T2}{\Phi d2 - \Phi d1} \quad (10)$$

By virtue of the configuration illustrated in FIG. 8, the magnet temperature estimator 6a can work out the permanent magnet temperature estimated value Tmag0 of the synchronous machine 1 before correction, during driving of the synchronous machine 1 according to the current commands Id*, Iq* in the d-q axes.

Needless to say, the permanent magnet temperature estimated value Tmag0 of the synchronous machine 1 before correction can be worked out, in the configuration of FIG. 8 as well, using the absolute value |Φe| of the estimated value Φe of the armature interlinkage magnetic flux Φ, instead of the d-axis flux estimated value Φde.

Further, a configuration may be adopted that includes a flux map denoting a correlation between the current commands Id*, Iq* in the d-q axes and the d-axis component of the armature interlinkage magnetic flux Φ under a condition of temperature different from the temperatures T1, T2. It is evident that the temperature estimation precision of the permanent magnets of the synchronous machine 1 becomes higher if the number of temperature conditions for working out the flux map is increased. However, a larger number of maps entails a significant burden in terms of map creation, and accordingly the number of maps is kept a small as possible.

In the configurations of FIG. 4 and FIG. 8 described above, the magnet temperature estimator 6 (or 6a) outputs the permanent magnet temperature estimated value Tmag0 of the synchronous machine 1 before correction by taking into account the armature current dependence on changes in the d-axis flux Φd with respect to changes in magnet temperature, in view of the fact that the correlation between the d-axis flux Φd and the temperature Tm of the permanent magnets varies depending on the magnetic saturation state of the synchronous machine 1.

In a synchronous machine 1 having permanent magnets as an actual field system, however, demagnetization occurs due to stress acting on the permanent magnets. Accordingly, the correlation between the d-axis flux Φd and the temperature Tm of the permanent magnets may exhibit deviations depending on the magnitude of the stress acting on the permanent magnets, even under identical armature current conditions.

In the present invention, therefore, the stress estimator 7 and the magnet temperature corrector 8 are provided in order to increase the precision of the temperature estimated value of the permanent magnets of the synchronous machine 1. The magnet temperature corrector 8 performs correction by calculating an amount of demagnetization due to stress on the basis of the stress acting on the permanent magnets, as estimated by the stress estimator 7, for the permanent magnet temperature estimated value Tmag0 of the synchronous machine 1 before correction as estimated by the magnet temperature estimator 6 (or 6a), and by converting the amount of demagnetization due to stress to a temperature correction amount.

A specific explanation follows next on a method for estimating the stress generated in the permanent magnets due to rotation of the synchronous machine 1, and on changes in flux density when stress is applied to the permanent magnets.

Figure 10:
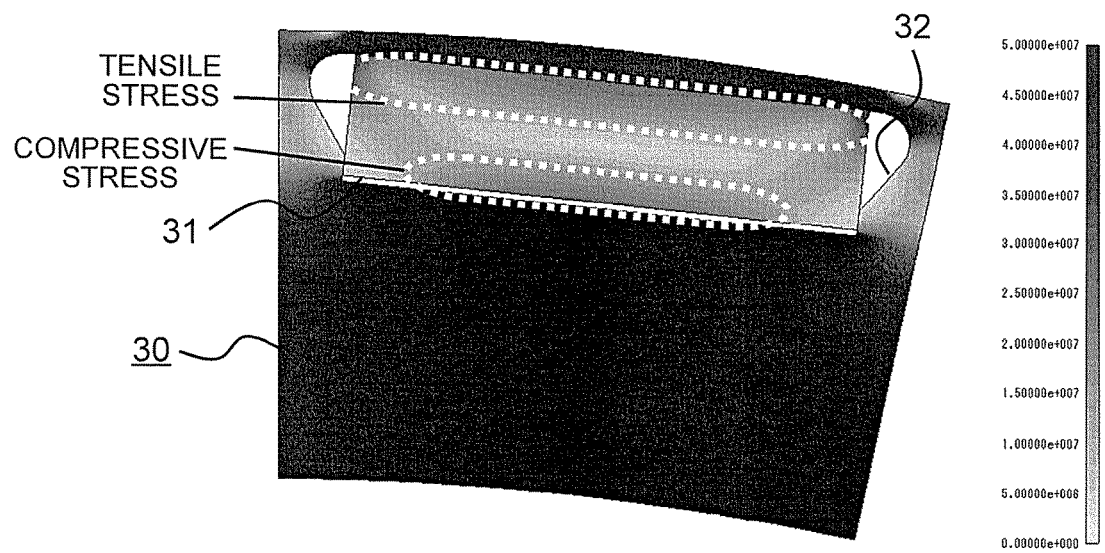
FIG. 10 is a contour figure illustrating a stress distribution in structural analysis results at a time where a rotor 30 of a synchronous machine 1 having a permanent magnet 31 according to Embodiment 1 of the present invention rotates at given revolutions.

FIG. 10 is a contour figure illustrating a stress distribution in structural analysis results at a time where a rotor 30 of the synchronous machine 1 having a permanent magnet 31 according to Embodiment 1 of the present invention rotates at given revolutions. Stress is generated in the permanent magnet 31, on account of the centrifugal force, as the rotor 30 of the synchronous machine 1 rotates. In the structural analysis illustrated in FIG. 10 a partial model is adopted as the rotor 30, for the purpose of shortening the analysis time. The permanent magnet 31, which is held in a slot 32 of the rotor 30, deforms in the shape of a bow on account of the centrifugal force. As a result, tensile stress occurs on the outer peripheral side and compressive stress on the inner peripheral side.

Figure 11:
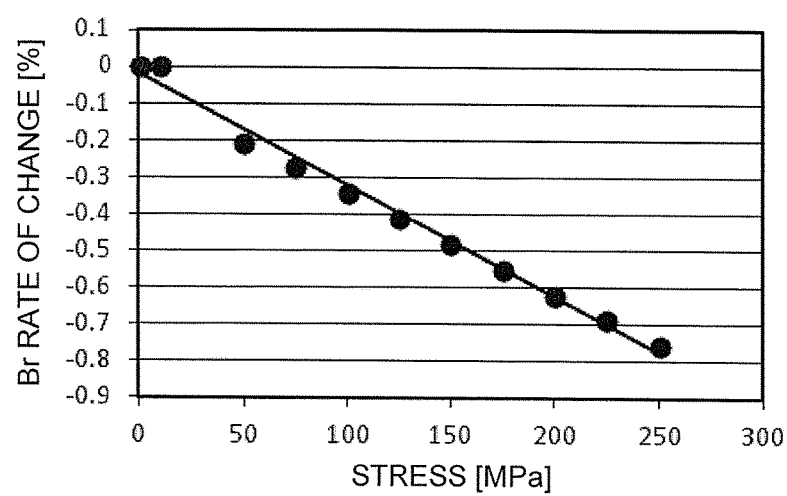
FIG. 11 is a diagram illustrating a rate of change of flux density Br with respect to applied compressive stress, as an experimental result at a time where compressive stress is applied to a permanent magnet in Embodiment 1 of the present invention.

FIG. 11 is a diagram illustrating the rate of change of the flux density Br with respect to the applied compressive stress, as an experimental result at a time where compressive stress is applied to the permanent magnets of Embodiment 1 of the present invention. When stress is applied to the permanent magnets, the rate of change of the magnetic flux density Br decreases as the stress increases, as illustrated in FIG. 11. Demagnetization occurs thus when stress is applied to the permanent magnets. In the analysis result illustrated in FIG. 11, demagnetization is of about 0.2% when stress of 50 MPa is applied.

Figure 12:
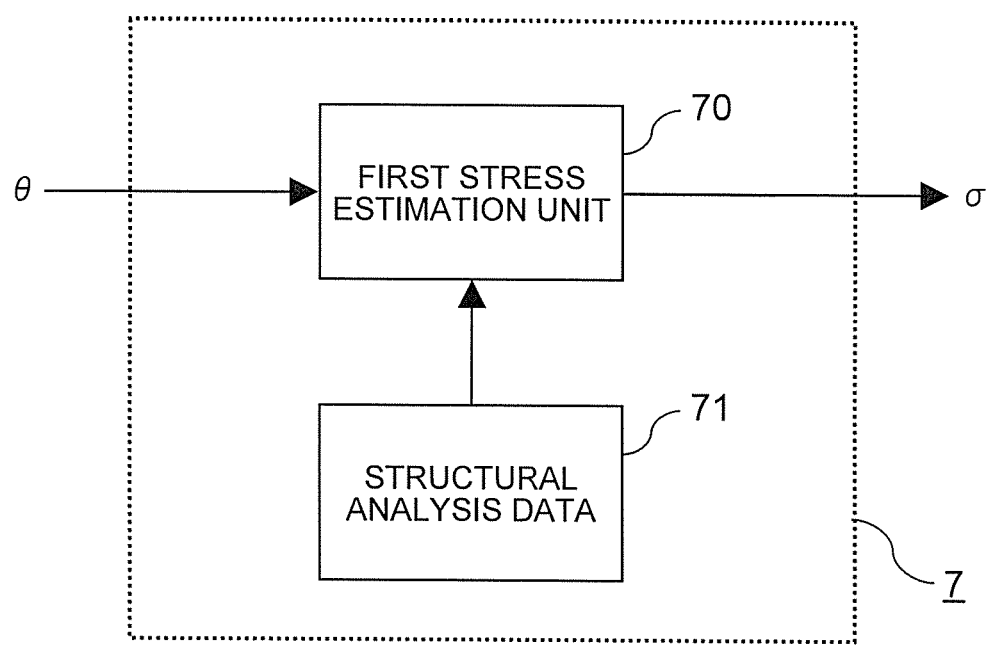
FIG. 12 is a configuration diagram illustrating an example of a stress estimator of permanent magnets of the synchronous machine control device according to Embodiment 1 of the present invention.

FIG. 12 is a configuration diagram illustrating an example of the stress estimator 7 of the permanent magnet 31 of the synchronous machine control device according to Embodiment 1 of the present invention. In the stress estimator 7 illustrated in FIG. 12, the first stress estimation unit 70 calculates the rotational speed ω on the basis of the rotor position θ of the synchronous machine 1, as detected by the position detector 4 (or 4a), and estimates a value σ of the stress that is applied to the permanent magnets by referring to structural analysis data 71 being a relationship worked out by structural analysis, between the stress acting on the permanent magnets 31 and the rotational speed ω.

The structural analysis data 71 can be a calculation expression denoting the relationship between rotational speed and stress, worked out from the structural analysis illustrated in FIG. 10, or a map of stress values corresponding to respective revolutions.

Figure 13:
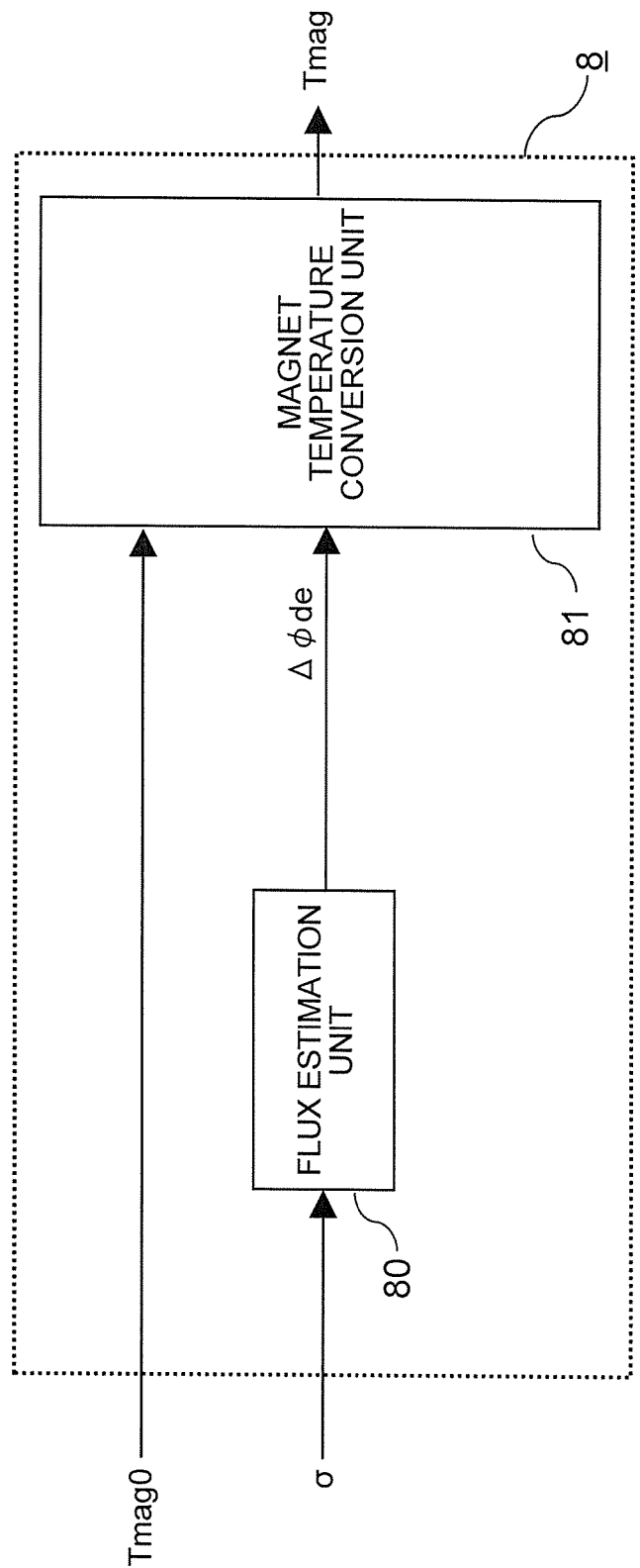
FIG. 13 is a configuration diagram illustrating an example of a magnet temperature corrector 8 in the synchronous machine control device according to Embodiment 1 of the present invention.

FIG. 13 is a configuration diagram illustrating an example of the magnet temperature corrector 8 in the synchronous machine control device according to Embodiment 1 of the present invention. The magnet temperature corrector 8 illustrated in FIG. 13 is configured by being provided with a flux estimation unit 80 and a magnet temperature conversion unit 81.

The flux estimation unit 80 derives a change amount $\Delta\varphi de$ of the armature interlinkage magnetic flux, derived from stress demagnetization, on the basis of the relationship between the stress σ worked out as a result of a pressure experiment of the permanent magnets, and the residual magnetization Br. The magnet temperature conversion unit 81 converts the change amount $\Delta\varphi de$ of the armature interlinkage magnetic flux derived from stress demagnetization to a temperature correction amount, corrects the permanent magnet temperature estimated value Tmag0, and outputs the permanent magnet temperature estimated value Tmag after correction.

The output permanent magnet temperature estimated value Tmag may be transmitted to the superordinate system, not described in the present Embodiment 1, and be used for control of the superordinate system. Specifically, in Embodiment 4 described below an example will be explained in which the permanent magnet temperature estimated value Tmag is fed back to the superordinate system, to correct the current commands in the d-q axes, while in Embodiment 5 described below an example will be explained in which a limitation is imposed to a torque command, using the permanent magnet temperature estimated value Tmag. The synchronous machine control device of Embodiment 1 has been thus explained above.

In Embodiment 1, as described above, the magnet temperature is estimated while grasping accurately changes in armature interlinkage magnetic flux with respect to changes in magnet temperature, which are different depending on the current command (magnetic saturation state of the synchronous machine). As a result an effect is elicited of making it possible to estimate, with good precision, the temperature of the permanent magnets, under any current (load) conditions, without attaching a direct temperature detector to the permanent magnets.

Moreover, the demagnetization fraction that occurs due to stress acting on the permanent magnets, and which can constitute a temperature estimation error, is corrected so as to allow separating the thermal demagnetization due to changes in the temperature of the permanent magnets, from demagnetization due to stress acting on the permanent magnets. An effect of enhancing the estimation precision of magnet temperature is achieved as a result.

Embodiment 2

A synchronous machine control device according to Embodiment 2 of the present invention will be explained next.

Figure 14:
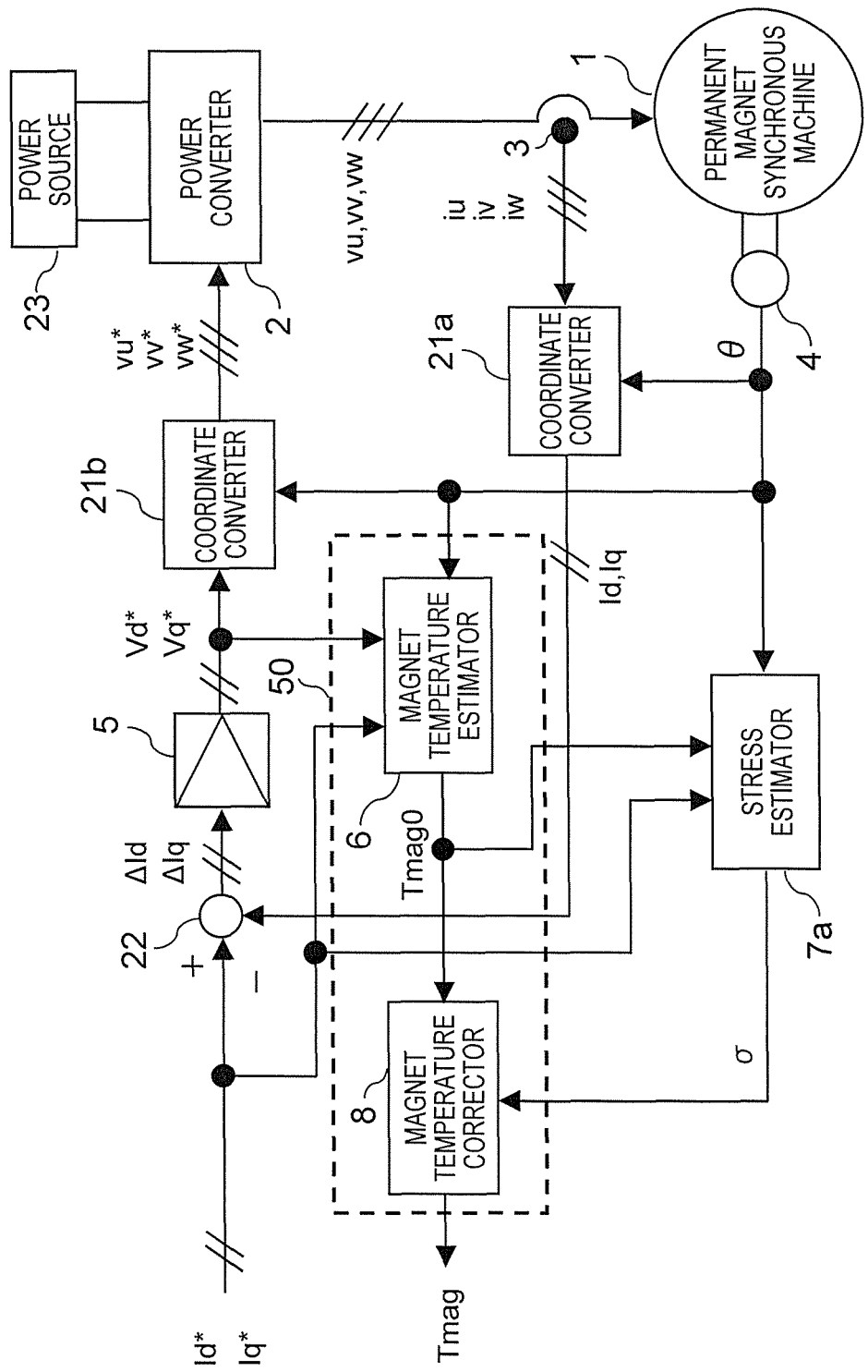
FIG. 14 is an overall configuration diagram of a synchronous machine control device according to Embodiment 2 of the present invention.

FIG. 14 is an overall configuration diagram of the synchronous machine control device according to Embodiment 2 of the present invention.

As illustrated in FIG. 14, in the synchronous machine control device according to the present Embodiment 2 the stress estimator 7 of the synchronous machine control device according to Embodiment 1 illustrated in FIG. 2 is now a stress estimator 7a configured to receive inputs in the form of the temperature Tmag0 of the permanent magnets estimated by the magnet temperature estimator 6, and the current commands Id*, Id*.

Figure 15:
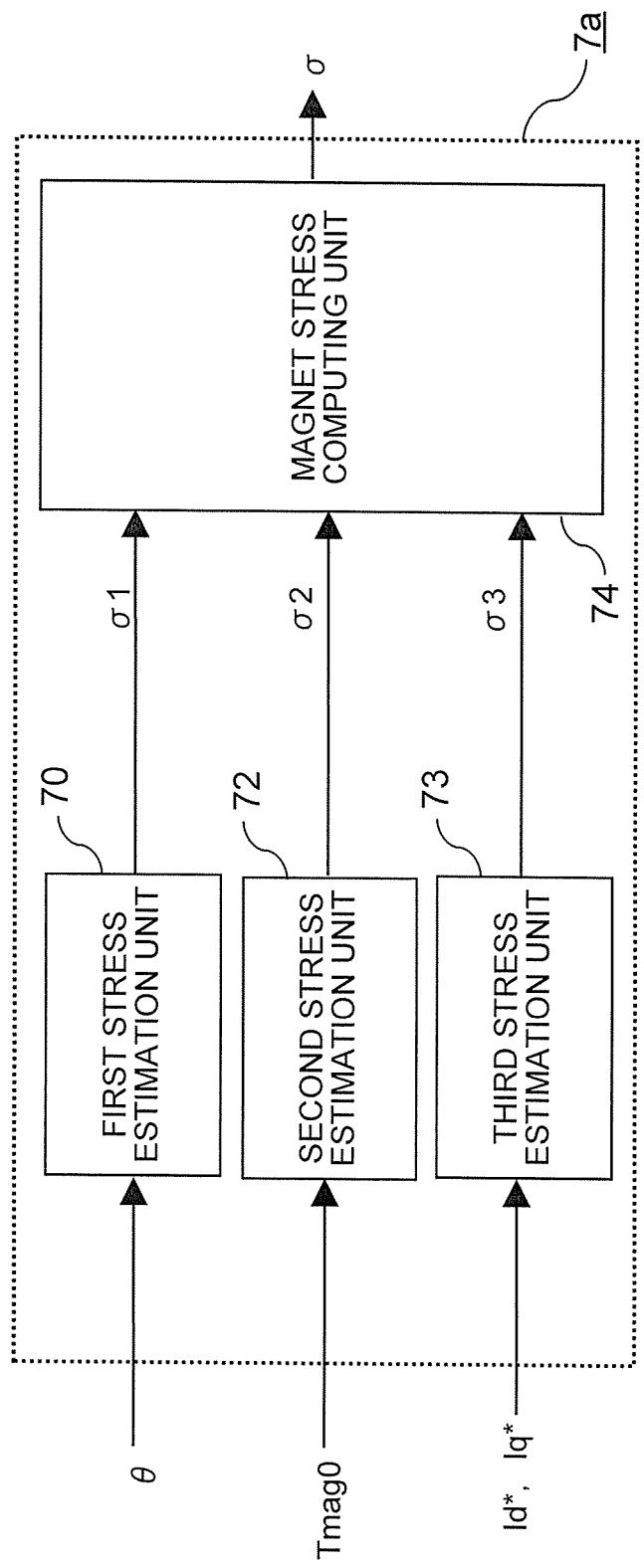
FIG. 15 is a configuration diagram illustrating an example of a stress estimator of permanent magnets of the synchronous machine control device according to Embodiment 2 of the present invention.

FIG. 15 is a configuration diagram illustrating an example of the stress estimator 7a of the permanent magnet 31 of the synchronous machine control device according to Embodiment 2 of the present invention. As illustrated in FIG. 15, the stress estimator 7a is made up of the first stress estimation unit 70 that calculates a rotational speed ω on the basis of the rotor position θ of the synchronous machine 1 and that estimates a stress σ1 applied to the permanent magnets, on the basis of structural analysis results; a second stress estimation unit 72 that estimates a stress σ2 applied to the permanent magnets, on the basis of the temperature Tmag0 of the permanent magnets estimated by the magnet temperature estimator 6; a third stress estimation unit 73 that estimates a stress σ3 applied to the permanent magnets on account of the torque generated by the current commands; and a magnet stress computing unit 74 that calculates the stress σ applied to the permanent magnets by summating the outputs σ1 to σ3 of the respective stress estimation units.

Further, FIG. 15 omits the notation of the structural analysis data 71 illustrated in FIG. 12 of Embodiment 1. Operations pertaining to other features are identical to those in FIG. 2 in Embodiment 1, and hence will be denoted by identical reference symbols, and an explanation thereof will be omitted. The synchronous machine control device according to Embodiment 2 has been thus explained.

In Embodiment 2, thus, the estimation of stress acting on the permanent magnets takes into consideration not only the stress estimated from the rotational speed of the rotor of the synchronous machine, but also thermal stress due to dimensional changes arising from changes in the temperature of the permanent magnets, as well as stress derived from the torque generated by driving currents. As a result an effect is elicited of making it possible to estimate the stress acting on the permanent magnets with yet higher precision.

Embodiment 3

A synchronous machine control device according to Embodiment 3 of the present invention will be explained next.

Figure 16:
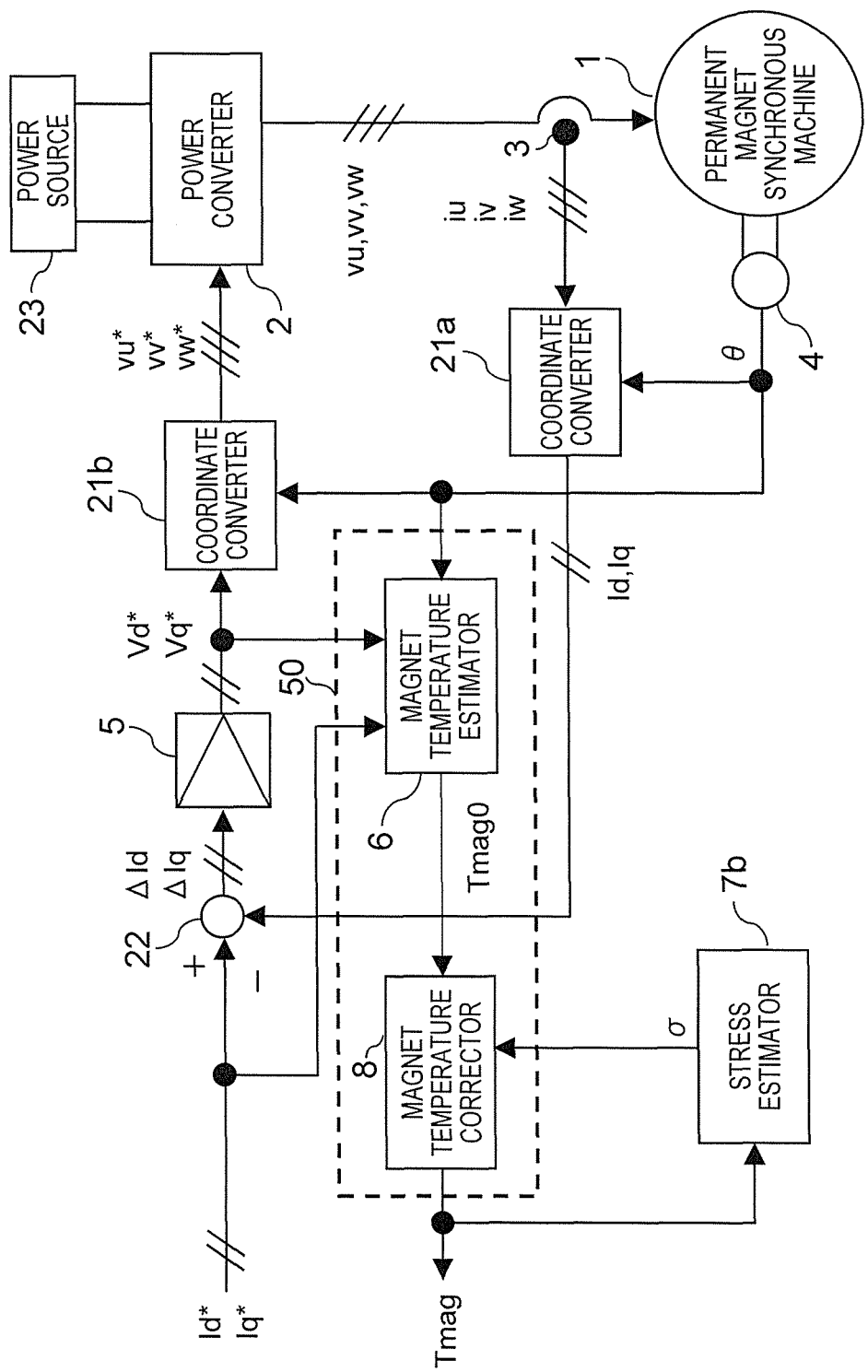
FIG. 16 is an overall configuration diagram of a synchronous machine control device according to Embodiment 3 of the present invention.

FIG. 16 is an overall configuration diagram of a synchronous machine control device according to Embodiment 3 of the present invention.

As illustrated in FIG. 16, in the synchronous machine control device according to the present Embodiment 3, the permanent magnet temperature estimated value Tmag having been corrected by the magnet temperature corrector 8 is input to the stress estimator 7*b*, to estimate as a result the stress σ (thermal stress) caused by dimensional changes accompanying changes in the temperature of the permanent magnets. The magnet temperature corrector 8 performs recursive temperature correction by using the stress σ to correct the permanent magnet temperature Tmag0 before correction. Operations pertaining to other features are identical to those in FIG. 2 of Embodiment 1, and hence will be denoted by identical reference symbols, and an explanation thereof will be omitted.

The stress estimator 7*b* estimates, for instance through structural analysis taking into consideration dimensional changes based on the coefficients of linear expansion of materials, the stress σ that is generated inside the permanent magnet 31, when dimensional changes in the latter are prevented by the slot 32 illustrated in FIG. 10. The synchronous machine control device of Embodiment 3 has been thus explained.

In the estimation of permanent magnet temperature in Embodiment 3, thus, a demagnetization fraction caused by stress acting on the permanent magnets, and which can constitute a temperature estimation error, is corrected so as to allow separating the thermal demagnetization due to changes in the temperature of the permanent magnets, from demagnetization due to stress acting on the permanent magnets. As a result an effect is elicited of making it possible to increase the precision of the estimation of the temperature of the permanent magnets.

In Embodiment 3, moreover, correction of the temperature of the permanent magnets is carried out recursively through estimation of the stress σ (thermal stress) generated on account of dimensional changes accompanying changes in the temperature of the permanent magnets. A yet more accurate temperature estimation can be achieved as a result.

Embodiment 4

A synchronous machine control device according to Embodiment 4 of the present invention will be explained next.

Figure 17:
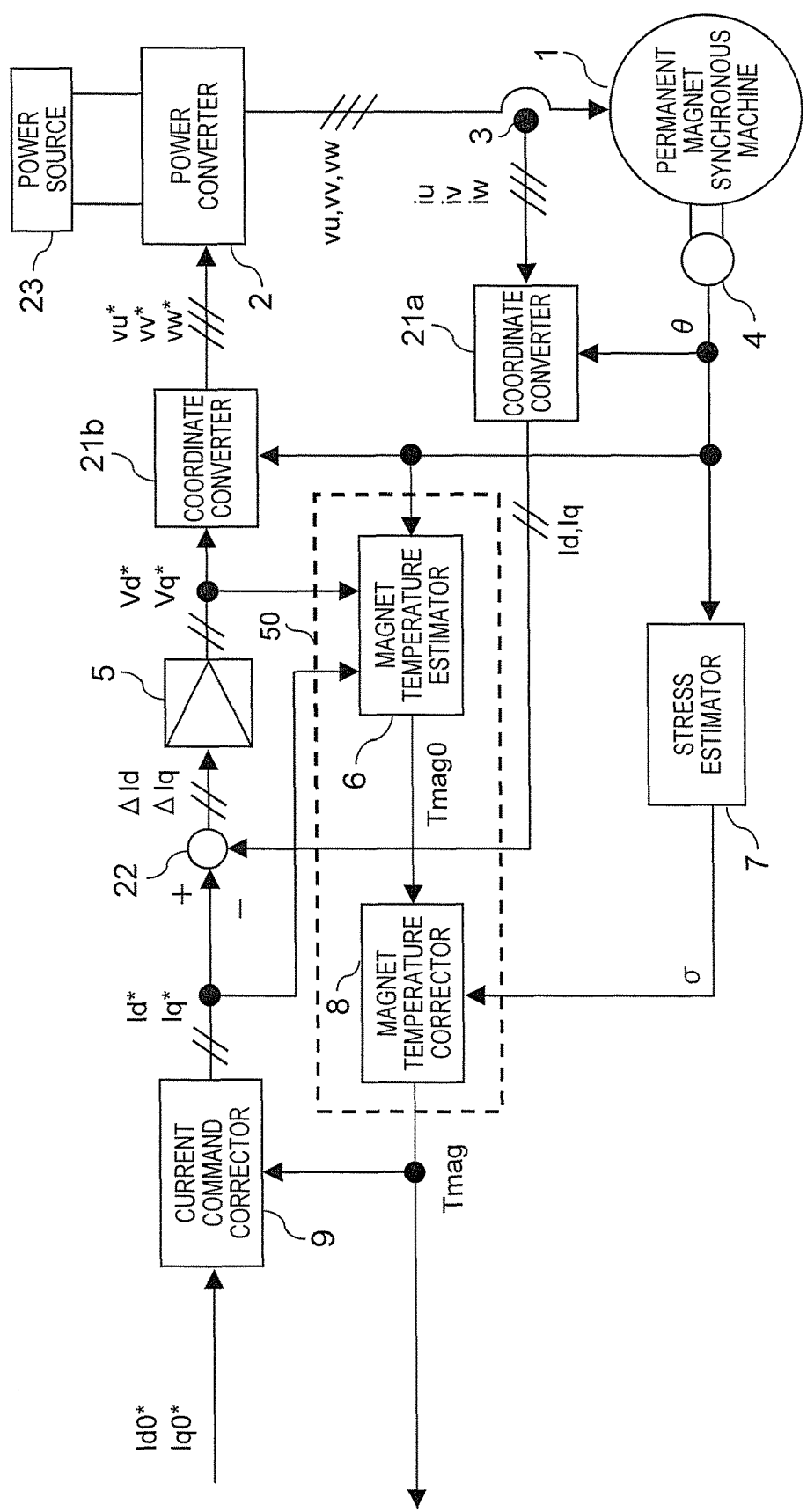
FIG. 17 is an overall configuration diagram of a synchronous machine control device according to Embodiment 4 of the present invention.

FIG. 17 is an overall configuration diagram of a synchronous machine control device according to Embodiment 4 of the present invention.

As illustrated in FIG. 17, the synchronous machine control device according to the present Embodiment 4 is further provided with a current command corrector 9 that corrects current commands in the d-q axes, in accordance with the permanent magnet temperature estimated value Tmag corrected by the magnet temperature corrector 8.

In the current commands in the d-q axes in FIG. 17, for convenience, Id0*, Iq0* are set as the current commands before correction, being the input side of the current command corrector 9, and Id*, Iq* are set as the current commands after correction, being the output side of the current command corrector 9.

The explanation below will focus on the features of the current command corrector 9 newly added, omitting explanations for other identical portions as appropriate.

One of the purposes of estimating the temperature Tm of the permanent magnets of the synchronous machine 1 are to correct variation in torque derived from demagnetization. When demagnetization occurs in the permanent magnets of the synchronous machine 1, there varies the torque generated on account of the permanent magnets. In the present Embodiment 4, therefore, the current commands Id* and Iq* are corrected within an allowable temperature range not leading to irreversible demagnetization, and the torque output of the synchronous machine 1 is adjusted, to correct variation in torque.

The torque τ output by the synchronous machine 1 is calculated in accordance with Expression (11) below. In the expression Pm denotes the number of pole pairs of the synchronous machine 1.

[Math. 11]

$$\tau = Pm\{\Phi m \cdot Iq + (Ld - Lq)Id \cdot Iq\} \quad (11)$$

It is evident that in Expression (11) the torque output by the synchronous machine 1 varies as the current commands Id* and Iq* are caused to change properly. Therefore, the current command corrector 9 adjusts the current commands Id* and Iq* in accordance with the corrected permanent magnet temperature estimated value Tmag.

The torque τ in Expression (11) varies when the Φm varies on account of changes in the temperature of the permanent magnets. Therefore, the current command corrector 9 adjusts the current commands Id*, Iq* so as to compensate for the variation in torque, on the basis of the permanent magnet temperature estimated value Tmag. The synchronous machine control device according to Embodiment 4 has been explained above.

In Embodiment 4, thus, the current command is corrected upon a rise in the temperature of the permanent magnets that form the field system of the synchronous machine. As a result an effect is elicited of making it possible to correct the variation in torque that accompanies thermal demagnetization, and of increasing torque precision.

Embodiment 5

A synchronous machine control device according to Embodiment 5 of the present invention will be explained next.

Figure 18:
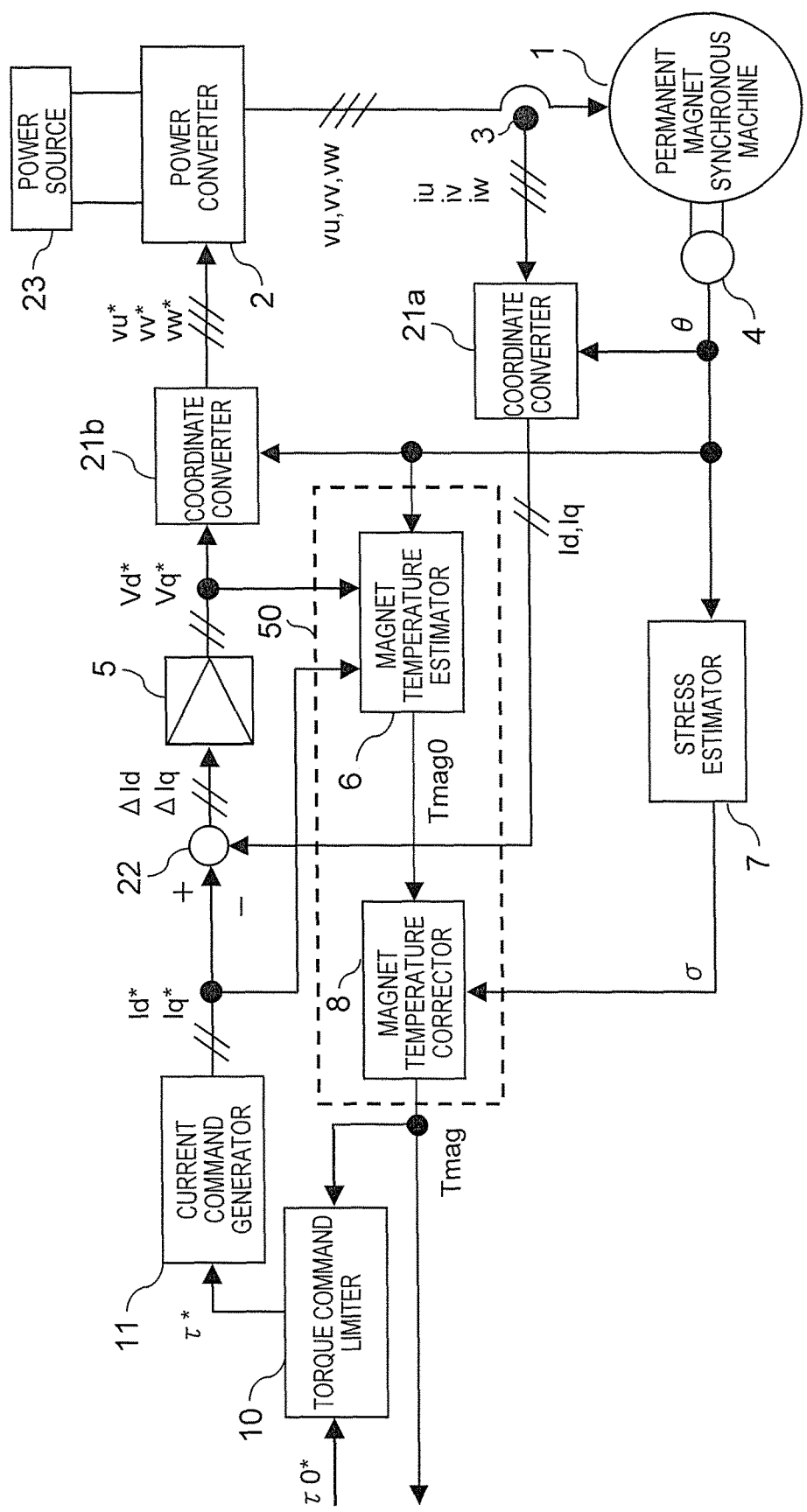
FIG. 18 is an overall configuration diagram of a synchronous machine control device according to Embodiment 5 of the present invention.

FIG. 18 is an overall configuration diagram of a synchronous machine control device according to Embodiment 5 of the present invention.

As illustrated in FIG. 18, the synchronous machine control device according to the present Embodiment 5 is further provided with: a torque command limiter 10 that limits a torque command for the synchronous machine 1 in accordance with the permanent magnet temperature estimated value Tmag corrected by the magnet temperature corrector 8; and with a current command generator 11 that generates a current command on the basis of the torque command having been limited.

Among the torque commands to the synchronous machine 1 of FIG. 18, for convenience, τ0* is set as a torque command before limitation, on the input side of the torque command limiter 10, and τ* is set as the torque command after limitation, on the output side of the torque command limiter 10.

The explanation below will focus on the features of the torque command limiter 10 and the current command generator 11 newly added, omitting explanations for other identical portions as appropriate.

In the present Embodiment 5 the torque command limiter 10 is configured to limit the torque command to the synchronous machine 1 in accordance with the corrected permanent magnet temperature estimated value Tmag, and to reduce the armature current (effective value), to thereby suppress further rises in temperature.

The torque command limiter 10 limits a torque command τ0* before limitation in the superordinate system, such as the one illustrated in Embodiment 1, in accordance with the corrected permanent magnet temperature estimated value Tmag, and outputs the command as a torque command τ* after limitation.

The correlation between the permanent magnet temperature estimated value Tmag and the torque command limit value is set in accordance with driving conditions related to iron loss, such as the rotational speed of the synchronous machine 1, as well as the heat capacity and the cooling performance of the synchronous machine 1.

When for instance the permanent magnet temperature estimated value Tmag exceeds a certain threshold value, the torque command limiter 10 determines that the permanent magnet temperature gradually approaches a temperature leading to irreversible demagnetization, and decreases the torque command; in an extreme case, the torque command limiter 10 performs processing such as setting the torque command to "0", and outputs the torque command τ* after limitation. The torque command limiter 10 may be configured so that the limit value of the torque command is gradually reduced stepwise as the permanent magnet temperature estimated value Tmag increases.

The current command generator 11 in FIG. 18 generates the current commands Id* and Iq* in the d-q axes, which are control commands, on the basis of the torque command τ* after limitation. In the case of a synchronous machine 1 having permanent magnets as a field system, as in the present invention, it is known that there is an infinite number of combinations of the d-axis current Id and the q-axis current Iq for which the same torque can be generated. Therefore, it suffices that the current command generator 11 outputs appropriate current commands Id*, Iq* in the d-q axes that match a desired condition (for example maximum efficiency condition, minimum current condition and the like) for the torque command τ* after limitation. However, in order to more effectively curtail rises in the temperature of the synchronous machine 1 and to prevent irreversible demagnetization, it is more preferable to select the current commands Id*, Iq* so that a condition is satisfied whereby currents for a same torque are minimal.

In another method, optimal values of the current commands Id*, Iq* in the d-q axes corresponding to various torques of the synchronous machine 1 may be measured and mapped beforehand, such that, during operation, the current commands Id*, Iq* in the d-q axes corresponding to the torque command τ* after limitation are obtained by referring to that map as needed. The synchronous machine control device of Embodiment 5 has been explained above.

In Embodiment 5, thus, a torque command is limited upon a rise in the temperature of the permanent magnets that form the field system of the synchronous machine. As a result an effect is elicited of making it possible to reduce armature current (effective value) that causes rises in magnet temperature, and to prevent irreversible demagnetization of the permanent magnets.

Embodiment 6

A synchronous machine control device according to Embodiment 6 of the present invention will be explained next.

Figure 19:
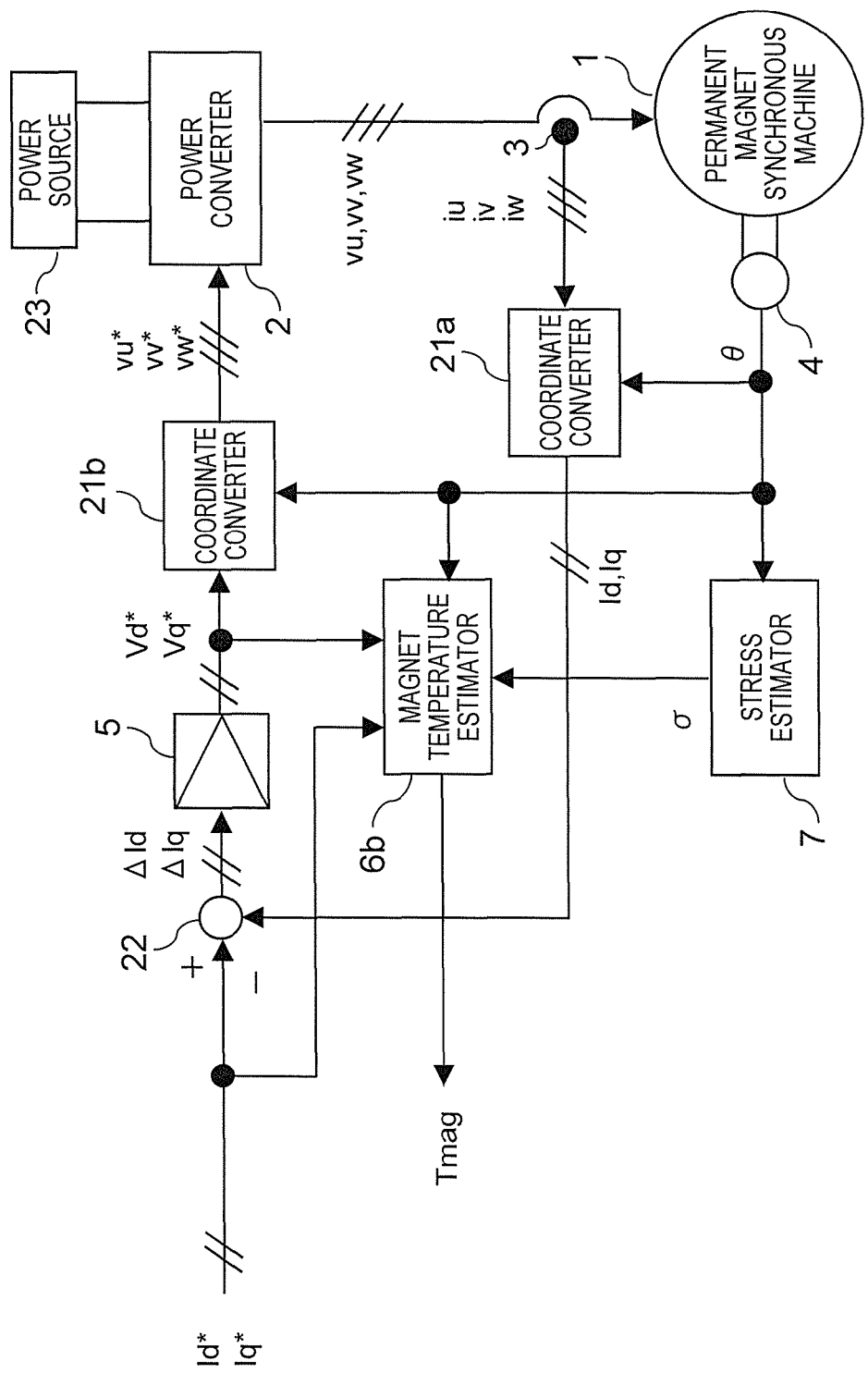
FIG. 19 is an overall configuration diagram of a synchronous machine control device according to Embodiment 6 of the present invention.

FIG. 19 is an overall configuration diagram of the synchronous machine control device according to Embodiment 6 of the present invention.

As illustrated in FIG. 19, in the synchronous machine control device according to the present Embodiment 6 the temperature Tmag of the permanent magnets is estimated by inputting, to a magnet temperature estimator 6b, the stress σ acting on the permanent magnets, as estimated by the stress estimator 7. That is, the magnet temperature estimator 6b combines the functions of both the magnet temperature estimator 6 and the magnet temperature corrector 8 illustrated in FIG. 2 of Embodiment 1; and fulfils the same role as the magnet temperature calculator 50 in which the foregoing two are combined.

Figure 20:
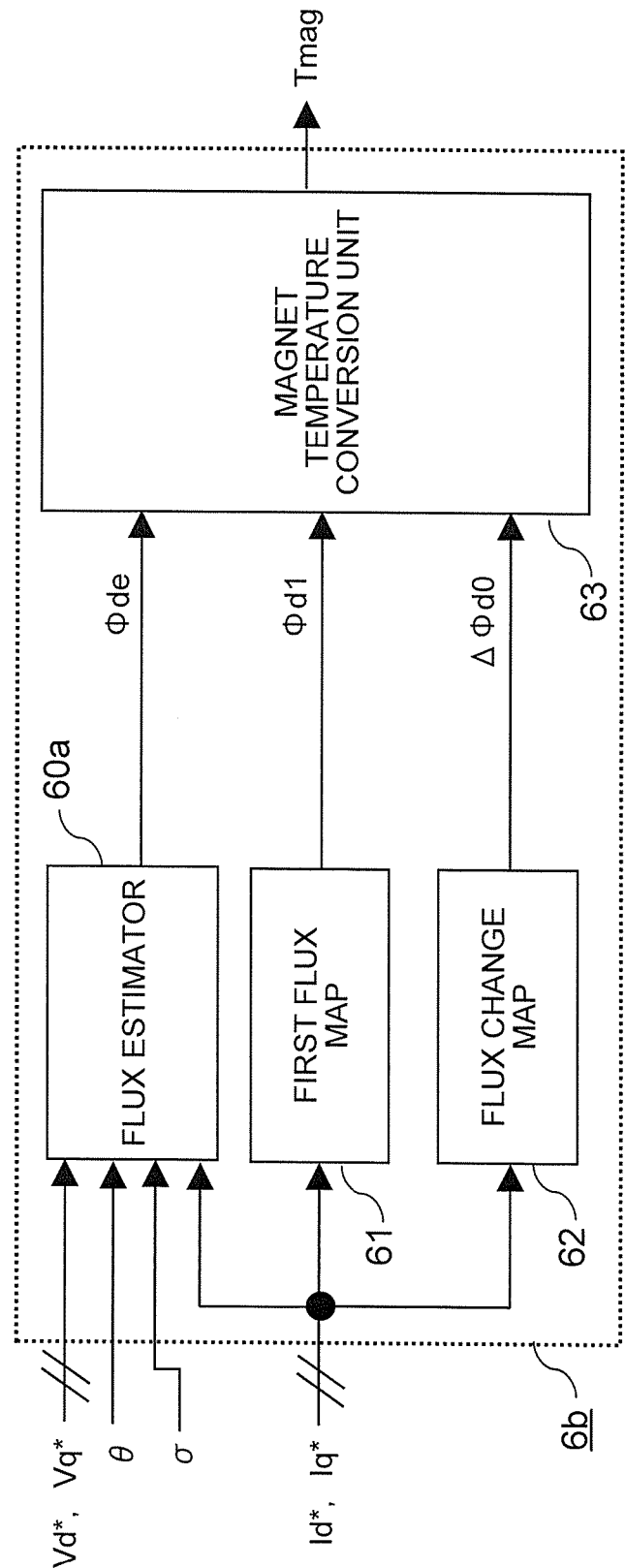
FIG. 20 is a configuration diagram illustrating an example of a magnet temperature estimator in the synchronous machine control device according to Embodiment 6 of the present invention.

FIG. 20 is a configuration diagram illustrating an example of the magnet temperature estimator 6b of the synchronous machine control device according to Embodiment 6 of the present invention. As illustrated in FIG. 20, the magnet temperature estimator 6b is provided with a flux estimator 60a, the first flux map 61, the flux change map 62 and the magnet temperature conversion unit 63. The magnet temperature conversion unit 63 outputs the temperature estimated value Tmag of the permanent magnets of the synchronous machine 1, on the basis of the d-axis flux estimated value Φde estimated by the flux estimator 60a, the first flux map 61 and the flux change map 62, during driving of the synchronous machine 1 according to the current commands Id*, Iq* in the d-q axes.

The flux estimator 60a estimates a state quantity relating to the armature interlinkage magnetic flux Φ on the basis of the rotational speed ω calculated from the rotor position θ detected by the position detector 4, the voltage commands Vd*, Vq* in the d-q axes, the current commands Id*, Iq* in the d-q axes (the currents Id, Iq in the d-q axes may be used instead of Id*, Iq*) and, in addition, the stress σ that is applied to the permanent magnets, as estimated by the stress estimator 7.

As illustrated in FIG. 13, in Embodiment 1 above there was provided the flux estimation unit 80 in the magnet temperature corrector 8, and the permanent magnet temperature Tmag0 estimated taking thermal demagnetization into consideration was corrected based on the change amount Δφde of the armature interlinkage magnetic flux derived from stress demagnetization. In the present Embodiment 6, by contrast, the d-axis flux estimated value Φde is estimated directly, taking into consideration also stress demagnetization in the flux estimator 60a of the magnet temperature estimator 6b, as illustrated in FIG. 20.

The magnet temperature estimator 6c illustrated below may be used instead of a magnet temperature estimator 6b illustrated in FIG. 20.

Figure 21:
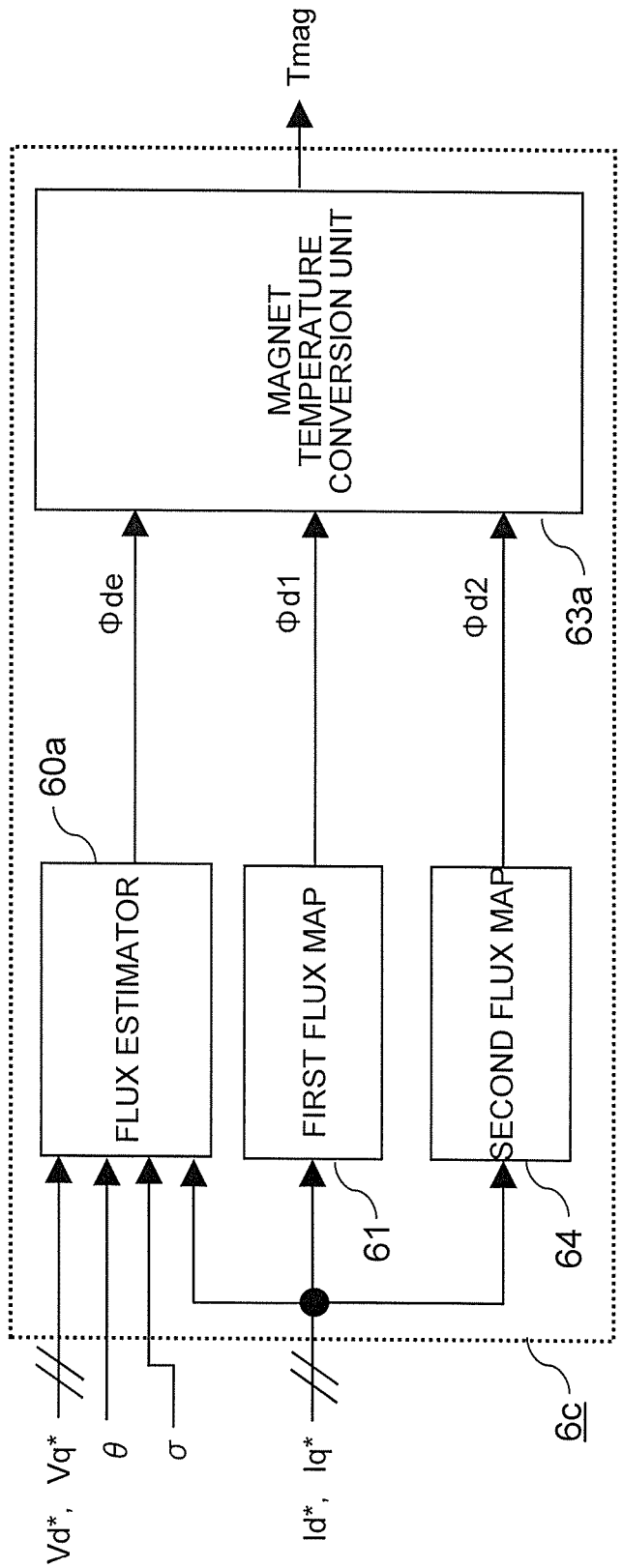
FIG. 21 is a configuration diagram illustrating an example of a magnet temperature estimator in the synchronous machine control device according to Embodiment 6 of the present invention.

FIG. 21 is a configuration diagram illustrating an example of the magnet temperature estimator 6c of the synchronous machine control device according to Embodiment 6. As illustrated in FIG. 21, the magnet temperature estimator 6c is configured by being provided with the flux estimator 60a, the first flux map 61, the second flux map 64 and the magnet temperature conversion unit 63a. The magnet temperature conversion unit 63a outputs the temperature estimated value Tmag of the permanent magnets of the synchronous machine 1 before correction, on the basis of the d-axis flux estimated value Φde estimated by the flux estimator 60a, the first flux map 61 and the second flux map 64, during driving of the synchronous machine 1 according to the current commands Id*, Iq* in the d-q axes.

Except for the portion relating to FIG. 13, operations pertaining to other features are identical to those in Embodiment 1, and hence will be denoted by identical reference symbols, and an explanation thereof will be omitted. Herein, however, the outputs of Expression (8) and Expression (10) above are not Tmag0 but Tmag. The synchronous machine control device of Embodiment 6 has been thus explained above.

In Embodiment 6, also the amount of demagnetization due to stress generated caused by stress acting on the permanent magnets is taken into account in the estimation of the permanent magnet temperature, and hence the precision of the magnet temperature estimation is accordingly increased.

The rotor position θ may be estimated and calculated using the position detector 4a explained in FIG. 3 of Embodiment 1, instead of the position detector 4 in Embodiments 2 to 6 described above.

In the embodiments described above, the magnet temperature estimators 6b, 6c and the magnet temperature calculator 50 correspond to the first magnet temperature estimator, and the magnet temperature estimators 6, 6a correspond to the second magnet temperature estimator.

The invention claimed is:

1. A synchronous machine control device, comprising:
   a synchronous machine having permanent magnets as a field system;
   a stress estimator that estimates stress that is applied to the permanent magnets by referring to data being a relationship between the stress acting on the permanent magnets and a rotational speed on the basis of a rotor position of the synchronous machine; and
   a first magnet temperature estimator that, on the basis of the estimated stress,
   calculates an amount of demagnetization due to stress of an armature interlinkage magnetic flux,
   estimates the armature interlinkage magnetic flux on the basis of the rotor position of the synchronous machine, a current command and a voltage command used in driving control of the synchronous machine, and the amount of demagnetization due to stress of the armature interlinkage magnetic flux, and
   outputs a permanent magnet temperature estimated value after correction, having factored therein the amount of demagnetization due to stress of the armature interlinkage magnetic flux from the estimated armature interlinkage magnetic flux.

2. The synchronous machine control device of claim 1, wherein the first magnet temperature estimator includes:
   a second magnet temperature estimator that estimates the armature interlinkage magnetic flux on the basis of the rotor position of the synchronous machine and a current command and a voltage command used in driving control of the synchronous machine, and estimates the temperature of the permanent magnets of the synchronous machine on the basis of the estimated armature interlinkage magnetic flux, and
   a magnet temperature corrector that, on the basis of the estimated stress acting on the permanent magnets, calculates an amount of demagnetization due to stress of armature interlinkage magnetic flux, converts the amount of demagnetization due to stress of the armature interlinkage magnetic flux to a temperature correction amount, corrects, by the temperature correction amount, the temperature of the estimated permanent magnets estimated by the second magnet temperature estimator, and outputs the permanent magnet temperature estimated value after correction.

3. The synchronous machine control device of claim 2, wherein the second magnet temperature estimator estimates the temperature of the permanent magnets that is in accordance with the estimated armature interlinkage magnetic flux, using a first flux map and a flux change map, stored beforehand:
   the first flux map being a correlation between the current command and the armature interlinkage magnetic flux under a condition where the temperature of the permanent magnets is a first temperature; and
   the flux change map being a correlation between the current command and a change amount of the armature interlinkage magnetic flux at the time of change of the temperature of the permanent magnets from the first temperature to a second temperature.

4. The synchronous machine control device of claim 2, wherein the second magnet temperature estimator estimates the temperature of the permanent ma)nets that is in accordance with the estimated armature interlinkage magnetic flux, using a first flux map and a second flux map, stored beforehand:
   the first flux map being a correlation between the current command and the armature interlinkage magnetic flux under a condition where the temperature of the permanent magnets is a first temperature; and
   the second flux map being a correlation between the current command and the armature interlinkage magnetic flux under a condition where the temperature of the permanent magnets is a second temperature.

5. The synchronous machine control device of claim 2,
   wherein the stress estimator calculates a rotational speed of the synchronous machine on the basis of the rotor position of the synchronous machine, and estimates stress acting on the permanent magnets on the basis of the calculated rotational speed based on structural analysis data relating stress acting on the magnet and rotational speed.

6. The synchronous machine control device of claim 2, wherein the stress estimator:
   calculates a rotational speed of the synchronous machine on the basis of the rotor position of the synchronous machine, and estimates, as a first stress, stress acting on the permanent magnets on the basis of the calculated rotational speed, estimates, as a second stress, stress acting on the permanent magnets on the basis of the estimated temperature of the permanent magnets, estimates, as a third stress, stress acting on the permanent magnets due to torque generated according to the current command, and estimates stress acting on the permanent magnets through summation of the first stress, the second stress and the third stress.

7. The synchronous machine control device of claim 2, wherein the stress estimator estimates stress acting on the permanent magnets on the basis of the permanent magnet temperature estimated value after correction obtained through correction by the magnet temperature corrector.

8. The synchronous machine control device of claim 2, further comprising:

a current command corrector that corrects the current command in accordance with the permanent magnet temperature estimated value after correction obtained through correction by the magnet temperature corrector.

9. The synchronous machine control device of claim 2, further comprising:

a torque command limiter that limits a torque command for the synchronous machine in accordance with the permanent magnet temperature estimated value after correction obtained through correction by the magnet temperature corrector; and a current command generator that generates the current command on the basis of the limited torque command having been limited by the torque command limiter.

10. The synchronous machine control device of claim 1, wherein the first magnet temperature estimator outputs the permanent magnet temperature estimated value after correction that is in accordance with the estimated armature interlinkage magnetic flux, using a first flux map and a flux change map, stored beforehand:

the first flux map being a correlation between the current command and the armature interlinkage magnetic flux under a condition where the temperature of the permanent magnets is a first temperature; and the flux change map being a correlation between the current command and a change amount of the armature interlinkage magnetic flux at the time of change of the temperature of the permanent magnets from the first temperature to a second temperature.

11. The synchronous machine control device of claim 1, wherein the first magnet temperature estimator outputs the permanent magnet temperature estimated value after correction that is in accordance with the estimated armature interlinkage magnetic flux, using a first flux map and a second flux map, stored beforehand:

the first flux map being a correlation between the current command and the armature interlinkage magnetic flux under a condition where the temperature of the permanent magnets is a first temperature; and the second flux map being a correlation between the current command and the armature interlinkage magnetic flux under a condition where the temperature of the permanent magnets is a second temperature.

12. The synchronous machine control device of claim 1, wherein the stress estimator calculates a rotational speed of the synchronous machine on the basis of the rotor position of the synchronous machine, and estimates stress acting on the permanent magnets on the basis of the calculated rotational speed, based on structural analysis data relating stress acting on the magnet and rotational speed.

13. A permanent magnet temperature estimation method for a synchronous machine that has permanent magnets as a field system, the method comprising:

estimating stress acting on the permanent magnets by referring to data being a relationship between the stress acting on the permanent magnets and a rotational speed on the basis of a rotor position of the synchronous machine;

calculating an amount of demagnetization due to stress of an armature interlinkage magnetic flux on the basis of the estimated stress;

estimating the armature interlinkage magnetic flux on the basis of the rotor position of the synchronous machine, a current command and a voltage command used in driving control of the synchronous machine, and the amount of demagnetization due to stress of the armature interlinkage magnetic flux; and outputting a permanent magnet temperature estimated value after correction, having factored therein the amount of demagnetization due to stress of the armature interlinkage magnetic flux from the estimated armature interlinkage magnetic flux.

14. The permanent magnet temperature estimation method for a synchronous machine of claim 13, wherein the estimating the armature interlinkage magnetic flux further includes:

estimating the armature interlinkage magnetic flux on the basis of the rotor position of the synchronous machine and a current command and a voltage command used in driving control of the synchronous machine;

estimating the permanent magnet temperature of the synchronous machine on the basis of the estimated armature interlinkage magnetic flux; and converting the amount of calculated demagnetization due to stress of the armature interlinkage magnetic flux to a temperature correction amount, correcting the estimated permanent magnet temperature by the temperature correction amount, and outputting the permanent magnet temperature estimated value after correction.

* * * * *